US011040293B2

United States Patent
Kanzler

(10) Patent No.: US 11,040,293 B2
(45) Date of Patent: Jun. 22, 2021

(54) FLUID COLLECTION DEVICE, MATERIAL EXCHANGE COLUMN AND METHOD FOR PRODUCING A FLUID COLLECTION DEVICE OF THIS TYPE

(71) Applicant: Linde Aktiengesellschaft, Munich (DE)

(72) Inventor: Karlmann Kanzler, Altotting (DE)

(73) Assignee: Linde Aktiengesellschaft, Munich (DE)

(*) Notice: Subject to any disclaimer, the term of this patent is extended or adjusted under 35 U.S.C. 154(b) by 323 days.

(21) Appl. No.: 16/300,129

(22) PCT Filed: May 11, 2017

(86) PCT No.: PCT/EP2017/025121
§ 371 (c)(1),
(2) Date: Nov. 9, 2018

(87) PCT Pub. No.: WO2017/194203
PCT Pub. Date: Nov. 16, 2017

(65) Prior Publication Data
US 2019/0143242 A1     May 16, 2019

(30) Foreign Application Priority Data
May 12, 2016 (EP) .................................. 16001078

(51) Int. Cl.
*B01D 3/00*     (2006.01)
*B01D 3/20*     (2006.01)
(Continued)

(52) U.S. Cl.
CPC .............. *B01D 3/008* (2013.01); *B01D 3/20* (2013.01); *B01D 3/324* (2013.01); *B01J 19/305* (2013.01);
(Continued)

(58) Field of Classification Search
CPC . B01D 3/008; B01D 3/20; B01D 3/324; B01J 19/305; B01J 19/325; B01J 2219/32275; F25J 3/04927
(Continued)

(56) References Cited

U.S. PATENT DOCUMENTS

| | | | |
|---|---|---|---|
| 4,744,929 A | 5/1988 | Robinson et al. | |
| 5,132,055 A | 7/1992 | Alleaume et al. | |

(Continued)

FOREIGN PATENT DOCUMENTS

| | | |
|---|---|---|
| CA | 2814848 A1 | 5/2012 |
| DE | 4314551 A1 | 11/1994 |

OTHER PUBLICATIONS

International Search Report dated Jul. 3, 2017 issued in corresponding PCT/EP2017/025121 application (3 pages).
English Abstract of DE 4314551 A1 published Nov. 17, 1994.

*Primary Examiner* — Charles S Bushey
(74) *Attorney, Agent, or Firm* — Millen White Zelano & Branigan, PC; Brion P. Heaney

(57) ABSTRACT

The invention relates to a fluid collection device (8), in particular a support collector unit, for collecting fluid flowing through a packing (4) of a material exchange column (1). The fluid collection device (8) includes a support ring (11), a plurality of support profiles (12-16) secured to the support ring (11) for supporting the at least one packing (4), and a plurality of collection channels (19-21) secured to the support ring (11) for collecting the fluid. The collection channels (19-21) are positioned in parallel to the support profiles (12-16) and the support profiles (12-16) are arranged in such a way that they are each arranged in a no-flow area (40, 41) of one of the collection channels (19-21).

17 Claims, 27 Drawing Sheets

(51) Int. Cl.
*B01J 19/32* (2006.01)
*F25J 3/04* (2006.01)
*B01J 19/30* (2006.01)
*B01D 3/32* (2006.01)

(52) U.S. Cl.
CPC ......... *B01J 19/325* (2013.01); *F25J 3/04927* (2013.01); *B01J 2219/32275* (2013.01)

(58) Field of Classification Search
USPC .................................................. 261/97, 110
See application file for complete search history.

(56) References Cited

U.S. PATENT DOCUMENTS

| | | | |
|---|---|---|---|
| 6,749,182 B1* | 6/2004 | Larson | B01D 3/20 202/158 |
| 7,007,932 B2* | 3/2006 | Armstrong | B01D 3/008 261/110 |
| 8,317,166 B2 | 11/2012 | Headley et al. | |
| 8,585,024 B2* | 11/2013 | Ferree | F28F 25/04 261/109 |
| 9,956,500 B2* | 5/2018 | Wehrli | B01D 3/324 |
| 2009/0049864 A1 | 2/2009 | Kovak et al. | |
| 2012/0111717 A1 | 5/2012 | Headley et al. | |
| 2016/0375419 A1* | 12/2016 | Pretz | B01J 8/008 422/143 |
| 2017/0328633 A1* | 11/2017 | Kanzler | E04C 3/02 |
| 2018/0050319 A1* | 2/2018 | Kanzler | B22F 3/1055 |

\* cited by examiner

FLUID COLLECTION DEVICE, MATERIAL EXCHANGE COLUMN AND METHOD FOR PRODUCING A FLUID COLLECTION DEVICE OF THIS TYPE

The invention relates to a liquid collection device, to a mass transfer column, in particular for air separation, and to a method for producing a liquid collection device of said type.

With the aid of mass transfer columns, such as rectification or air separation columns, it is possible to separate liquefied air or other liquid substance mixtures with different boiling points into their constituents. Such a mass transfer column has a cylindrical vessel, in which so-called packings are arranged. A distinction is made here between unordered and ordered packings. Unordered packings are loose fills of bodies of a defined shape, such as rings, cylinders, saddles or the like. By contrast to this, in the case of ordered packings, metal meshes or sheets are folded and/or wound in such a way that intensive diversion of the vapor and the liquid occurs, along with associated intensive contact of the two. In the case of ordered packings, a number of packing plates are stacked one on top of the other. Between the packings, there are positioned collection and distribution systems, with the aid of which liquid flowing in the mass transfer column from top to bottom through the packings is collected, mixed and distributed uniformly again over the cross section of the mass transfer column.

EP 0 607 887 A2 describes a collection and distribution system of said type with a vertically arranged infeed pipe, in which a concentration equalization occurs, and a horizontally arranged main pipe, which is configured to distribute the liquid uniformly between distribution pipes. The distribution pipes have, in their bottom side, bores through which the liquid is distributed uniformly, resulting also in hydraulic equalization.

US 2009/0049864 A1 presents a liquid collection device for a mass transfer column. The liquid collection device comprises a support ring, to which support profiles and a base which terminates the support profiles at the bottom side are fastened. Upwardly extending vapor passages are provided on the base.

DE 43 14 551 A1 describes an apparatus for a mass transfer column, which apparatus is designed such that a support grate, a liquid collector and a gas or vapor distributor are combined with one another. For this purpose, bearing rails serve for an unordered or structured packing. Said bearing rails are connected, by means of obliquely inclined outflow channels arranged offset with respect to one another, to outflow shafts, between which there are provided gas or vapor shafts, wherein the outflow shafts conduct the liquid into collecting shafts.

Against this background, it is the object of the present invention to provide an improved liquid collection device for a mass transfer column.

Accordingly, a liquid collection device, in particular a support collector unit, for collecting liquid flowing through a packing of a mass transfer column is proposed. The liquid collection device comprises a support ring, a multiplicity of support profiles which are fastened to the support ring and which serve for supporting the at least one packing, and a multiplicity of collection channels which are fastened to the support ring and which serve for collecting the liquid, wherein the collection channels are positioned parallel to the support profiles, and wherein the support profiles are arranged so as to be arranged in each case in a flow shadow of one of the collection channels.

The liquid collection device is suitable for use in a mass transfer column. The packing is preferably a structured or ordered packing. Between the packing and the liquid collection device, there may be arranged a fluid-permeable grating which lies on the support profiles. The liquid collection device performs a dual function, specifically supporting the packing and collecting the liquid flowing through the packing. The liquid collection device can thus also be referred to as support collector or support collector unit. The liquid collection device may also be referred to as liquid collection apparatus. A flow shadow or wind shadow is to be understood in the present case to mean a zone of relatively low flow speed on a downstream side of a flow obstruction, in this case of the collection channels. By virtue of the fact that the support profiles are arranged in the flow shadows and not between the collection channels, the cross sections of the support profiles do not contribute to the flow resistance of the liquid collection device. In this way, the flow resistance of the liquid collection device is kept low. The support ring is preferably fixedly connected to a vessel of the mass transfer column. The support ring may also be assigned to the vessel. The support ring may be fixedly welded to an inner wall of the vessel. The support ring may be in the form of an encircling ring. The support ring may alternatively also have discontinuities. That is to say, the support ring may also be constructed from multiple individual segments, which may also be spaced apart from one another. For the installation of the liquid collection device into the vessel of the mass transfer column, there are numerous possibilities. Either the liquid collection device is inserted into the vessel of the mass transfer column, and the support ring is fastened directly to the inner wall of the vessel, or the liquid collection device is inserted into the vessel of the mass transfer column, and the in particular first support ring of the liquid collection device is fastened to a second support ring which is already fastened to the inner wall of the vessel. In this case, the first support ring preferably should not shift the flow cross-sectional area any further than the second support ring, or should not project radially further inward than the second support ring.

The mass transfer column preferably comprises multiple such liquid collection devices. Each liquid collection device may be assigned at least one packing or a multiplicity of packings arranged one above the other. Each packing may be constructed from multiple packing plates stacked one on top of the other. The packing plates in turn may be divided into individual packing packets. The mass transfer column may also be a rectification or air separation column. In particular, the mass transfer column may be an industrial plant, for example for nitrogen production, or part of an industrial plant.

In one embodiment, each collection channel is assigned exactly one support profile.

It is preferable for each support profile to be assigned a pair of collection channels. Between the pairs of collection channels there is preferably arranged a collection tank of the liquid collection device, into which the collection channels open.

According to a further embodiment, the collection channels are configured to generate the respective flow shadow in a gas flow flowing through the liquid collection device counter to a direction of gravitational force.

During the operation of the mass transfer column, a liquid flow flows from top to bottom through the mass transfer column in the direction of gravitational force. In a countercurrent configuration with respect to this, the gas flow flows from bottom to top through the mass transfer column counter to the direction of gravitational force. The gas flow may also be referred to as vapor flow. In the present case, vapor is selected as a term for a chemically pure gaseous substance when considered in relation to its liquid or solid state of aggregation. Vapor may arise as a result of evaporation of a liquid and convert back into said liquid as a result of condensation. By virtue of the fact that the vapor and the liquid come into contact repeatedly in succession as they flow in countercurrent configuration through the mass transfer column, it is possible by means of the mass transfer column for the separating effect to be many times greater in comparison with distillation.

In a further embodiment, the support profiles are arranged in each case between two side walls of a collection channel assigned to the respective support profile.

Each collection channel preferably has a first side wall and a second side wall arranged spaced apart from and parallel to the first side wall. Between the side walls there is provided a base which connects these. A respective transition between one of the side walls and the base is preferably rounded. In this way, the collection channels are particularly streamlined. The collection channels are preferably manufactured from a steel sheet.

In a further embodiment, the support profiles are arranged in each case at least in sections within a collection channel assigned to the respective support profile.

It is preferable for each support profile to have a first flange and a second flange, which are connected to one another by means of a web. It is preferable for at least the second flange to be arranged entirely within the collection channel assigned to the respective support profile. By virtue of the fact that the support profiles are arranged within the collection channels assigned thereto, a particularly compact construction of the liquid collection device in the direction of gravitational force can be realized. In this way, the mass transfer column can be reduced in height, or the number of packings arranged in the vessel of the mass transfer column can be increased.

In a further embodiment, the support profiles are of I-shaped cross section.

The support profiles are preferably I beams or double-T beams. In particular, the support profiles are inexpensively manufacturable extruded profiles. In this way, the liquid collection device can be produced particularly inexpensively.

In a further embodiment, the support profiles have in each case two flanges and a web which connects the flanges to one another, wherein a first flange averted from the respective collection channel narrows in a direction of gravitational force.

In the present case, narrowing is to be understood to mean that a cross section of the first flange decreases in size and/or tapers in the direction of gravitational force.

In a further embodiment, the first flange is droplet-shaped.

A droplet shape is to be understood in the present case to mean a geometry which tapers from a first, wide end section to a second, narrow end section. The geometry preferably has rounded and/or curved contours. The first flange is thus particularly streamlined. In the present case, droplet-shaped may however also be understood to mean triangular or pentagonal, in particular diamond-shaped.

In a further embodiment, the collection channels are of U-shaped cross section.

A U shape has two mutually oppositely situated side walls, which are connected to one another by means of a base. The collection channels may have rounded transitions provided between the respective side walls and the base.

In a further embodiment, between two adjacent collection channels, there is provided in each case at least one cover device which projects at least partially beyond side walls, facing toward one another, of the adjacent collection channels.

The cover device may have one or more cover sheets which are fixedly connected to holding elements. The holding elements are suspended on two adjacent support profiles, and are preferably welded or riveted thereto. The respective cover sheet of a cover device may be planar or bent into a roof shape. It is furthermore possible for multiple cover sheets to be arranged one above the other. For example, provision may be made of second or lower cover sheets, which are arranged in a roof shape and which have a central gas passage, and of a first or upper cover sheet, which is provided above the second cover sheets in the direction of gravitational force.

In a further embodiment, the at least one cover device has lower cover sheets, between which there is provided a gas passage which is covered by an upper cover sheet which projects laterally beyond the two lower cover sheets.

In a further embodiment, the at least one cover device is suspended on two adjacent support profiles.

The holding elements are provided for this purpose. The holding elements may be welded at an end side to the cover sheets, such that no liquid can flow out via the cover sheets at the end side. The liquid flowing through the mass transfer column is conducted into the collection channels via longitudinal sides of the cover sheets. At the longitudinal sides, there may be provided rounded edgings, whereby a drip edge is formed.

In a further embodiment, the liquid collection device furthermore comprises a collection tank which is fastened to the support profiles and into which the collection channels open.

The collection tank is configured to conduct the liquid collected by the collection channels to an outflow pipe. The outflow pipe may be connected to an inflow pipe of a liquid distribution device arranged below the liquid collection device. The collection channels are arranged with a gradient in the direction of the collection tank. The collection channels are preferably fixedly connected, in particular welded, both to the collection tank and to the support ring. The collection channels are preferably each fastened pairwise laterally to the collection tank.

In a further embodiment, the liquid collection device furthermore comprises a collection tank which is fastened to the support profiles and which is equipped with at least one infeed or extraction connector.

In a further embodiment, the liquid collection device furthermore comprises a collection tank which is fastened to the support profiles and which has a gas infeed tank, which gas infeed tank is arranged within the collection tank and fastened to the support profiles and has an infeed connector, in particular a gas infeed connector. The gas infeed tank has a base, which is preferably equipped with outflow openings.

In a further embodiment, the liquid collection device furthermore comprises a collection tank which is fastened to the support profiles and which is equipped with at least one infeed or extraction connector. It is preferable if the collection tank also comprises an extraction tank equipped with an extraction connector. The collection tank and the extraction tank are preferably connected to one another by means of an opening.

In a further embodiment, the liquid collection device furthermore comprises multiple parallel collection tanks which are fastened to the support profiles and into which the collection channels open.

In a further embodiment, the collection tank is arranged perpendicular to the support profiles.

In particular, the collection tank is also arranged perpendicular to the collection channels. In the present case, perpendicular is to be understood to mean an angle of 90°±10°, more preferably of 90°±5°, more preferably of 90°±1°, more preferably of exactly 90°. The collection tank is preferably manufactured from an aluminum sheet.

In a further embodiment, the support profiles may, below the lowermost packing in a rectification column, where no further collection function is necessary, be used purely as a support grate without collection channels and collection tank.

In a further embodiment, the collection tank may, at one or both ends, be welded to the vessel and equipped with an infeed or extraction connector. Furthermore, an extraction tank with an extraction connector may be provided below the collection tank at one or both ends.

In a further embodiment, the collection tank may be equipped with at least one laterally arranged extraction connector.

In a further embodiment, the collection tank may, at one or both ends, be welded to the vessel and equipped in the interior with a gas infeed tank, which is equipped with at least one infeed connector. The gas infeed tank may, at the base, have outflow openings for the outflow of liquid.

In a further embodiment, the liquid collection device may comprise multiple collection tanks arranged in parallel.

Also proposed is a mass transfer column, in particular for air separation, having a vessel, having at least one packing arranged within the vessel, and having a liquid collection device of said type arranged within the vessel.

In one embodiment, the mass transfer column furthermore comprises a packing arrangement which has the liquid collection device, a liquid distribution device and the at least one packing, which is arranged between the liquid collection device and the liquid distribution device.

The packing arrangement may have multiple packings, which are arranged between the liquid collection device and the liquid distribution device. In the direction of gravitational force, the liquid distribution device is arranged above the liquid collection device. The mass transfer column may have multiple such packing arrangements, which are arranged one above the other in the vessel of the mass transfer column. Here, in each case the outflow pipe of a liquid collection device is connected to the inflow pipe of a liquid distribution device arranged below the liquid collection device in the direction of gravitational force.

A method for producing a mass transfer column of said type is also proposed. The method comprises the following steps: providing a support ring, a multiplicity of support profiles and a multiplicity of collection channels, and fastening the support profiles and the collection channels to the support ring such that the collection channels are positioned parallel to the support profiles and that the support profiles are arranged so as to be arranged in each case in a flow shadow of one of the collection channels.

The method may also comprise a step of providing a vessel and arranging a support ring within the vessel. During the arrangement of the support ring within the vessel, said support ring may be welded to the vessel. Alternatively, the liquid collection device may firstly be constructed from the support ring, the support profiles and the collection channels and the collection tank, and lifted as a complete unit into the vessel of the mass transfer column, with the support ring then being welded to the vessel. For this purpose, the second support ring may be provided on the vessel. The support ring of the liquid collection device may then be a first support ring.

Further possible implementations of the liquid collection device, of the mass transfer column and/or of the method also include combinations of features or embodiments described above or below with respect to the exemplary embodiments that have not been explicitly mentioned. A person skilled in the art will also add individual aspects as improvements or supplementations to the respective basic form of the mass transfer column and/or of the method.

BRIEF DESCRIPTION OF THE DRAWINGS

Further advantageous design embodiments and aspects of the liquid collection device, of the mass transfer column and/or of the method are the subject matter of the dependent claims and of the exemplary embodiments of the mass transfer column and/or of the method described below. The mass transfer column and/or the method will be explained in more detail hereunder on the basis of preferred embodiments with reference to the appended figures.

In the figures, elements that are identical or have the same function have been provided with the same reference signs, unless stated otherwise.

Figure 1:
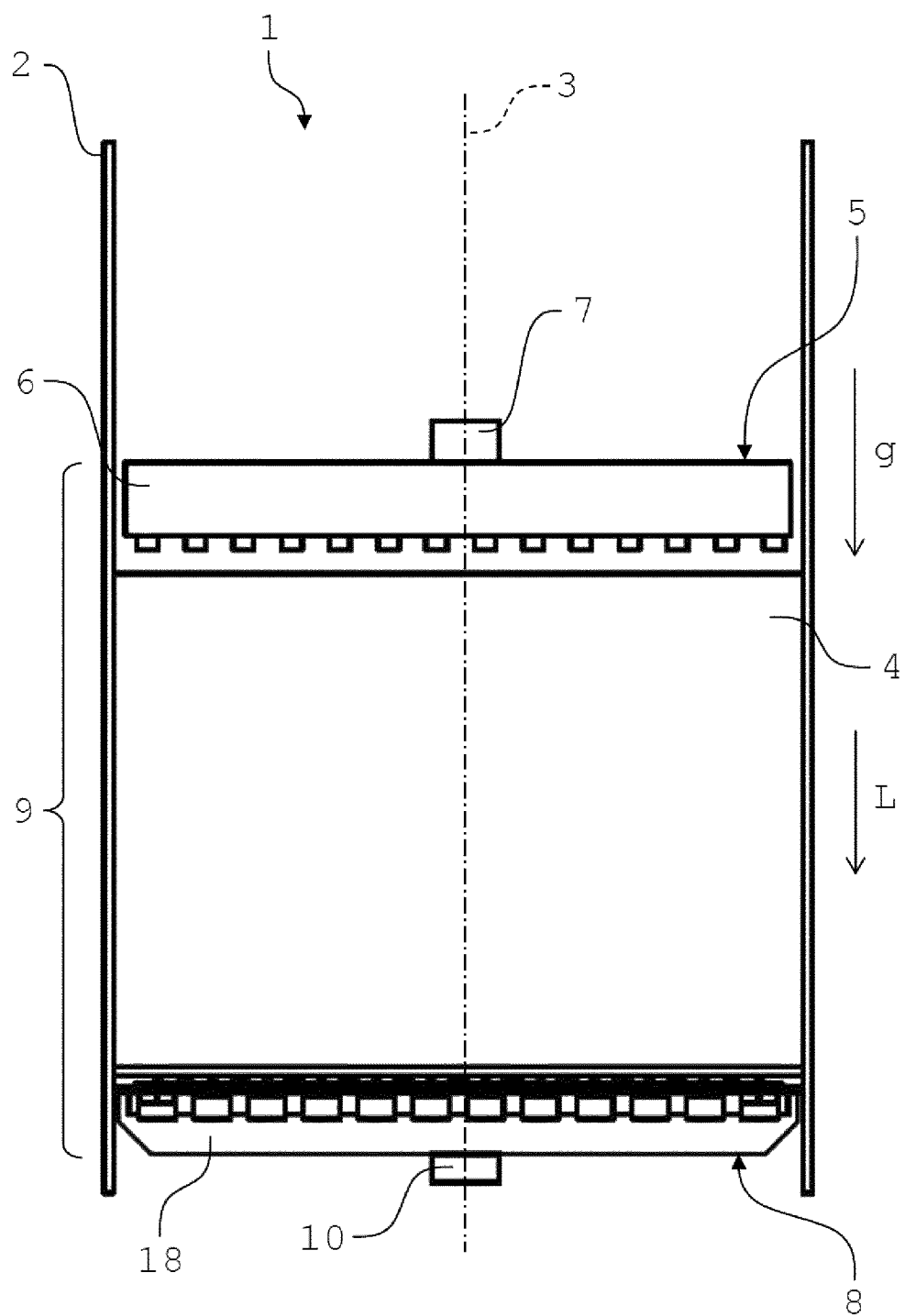
FIG. 1 shows a schematic sectional view of one embodiment of a mass transfer column.

FIG. 1 shows a greatly simplified schematic view of one embodiment of a mass transfer column 1. The mass transfer column 1 may be an industrial plant or part of an industrial plant. The mass transfer column 1 may be a rectification or air separation column. That is to say, the mass transfer column 1 may be suitable for air separation, in particular for cryogenic separation of air. Air separation, or the Linde process, is a technical method for gas separation which permits the liquefaction of gas mixtures such as air and individual atmospheric gases, such as oxygen, nitrogen and argon, in large quantities, and which serves in this context for refrigeration in the temperature range from 77 to 100 K.

Rectification should be understood as meaning a thermal separating process which represents an extension of distillation or an arrangement of many distillation steps in series. As compared with distillation, the advantages of rectification are that the mass transfer column 1 can be operated continuously and that the separating effect is many times greater in comparison with distillation, since the vapor comes into contact with the liquid in countercurrent repeatedly in succession. The mass transfer column 1 consequently operates more efficiently in terms of energy, is technically less complex and is more space-saving than an arrangement of single distillations one after the other.

The mass transfer column 1 comprises a vessel 2, which has a cylindrical geometry. The vessel 2 may be circular or at least approximately circular in cross section. The vessel 2 may be produced from an aluminum material or a steel material. The vessel 2 is preferably produced from an aluminum material. The vessel 2 is constructed cylindrically around an axis of symmetry or central axis 3. Multiple packing sections, packing beds or packings 4 are arranged one above the other in the vessel 2. Only one packing 4 is shown in FIG. 1. It is however possible for any desired number of packings 4 to be arranged one above the other in the vessel 2, wherein the packings 4 may be of different heights. Here, the packings 4 may be structurally identical or of different construction. The number of packings 4 accommodated in the vessel 2 is arbitrary. The packings 4 are so-called ordered or structured packings 4. Each packing 4 may be constructed from at least one ordered or structured packing plate but in particular from a multiplicity of ordered or structured packing plates layered one on top of the other, which are not shown in FIG. 1. The packing plates may in turn each be divided into a multiplicity of block-like packing elements or packing packets.

Such structured packings 4 or the packing plates thereof consist of thin, corrugated and/or perforated metal plates, or wire meshes. The design of the packing plates ensures an optimum exchange between the various phases (liquid/gaseous or liquid/liquid) with minimal pressure resistance. In physical chemistry, thermodynamics, materials science or fluid mechanics, a phase is to be understood to mean a spatial region in which the defining physical parameters, in particular order parameters, such as the density or the refractive index, and the chemical composition of the material are homogeneous. In the context of thermodynamics, a phase is each homogeneous part of a system. The packing plates are arranged one above the other in the vessel 2. There can be any number of packing plates per packing 4. The packing plates may be produced from perpendicularly arranged, corrugated aluminum sheets. Because of their structure, the packing plates form condensation surfaces, on which the constituents of air can condense. For example, the aluminum sheets used may have a thickness of 0.1 mm.

A liquid distribution device 5 for the uniform distribution of liquid is provided above the packing 4 in the orientation of FIG. 1. During the operation of the mass transfer column 1, liquid flows through the packing 4 from top to bottom in a direction of gravitational force g in the orientation of FIG. 1. At the same time, gas flows from bottom to top through the packing 4 counter to the direction of gravitational force g. The mass transfer column 1 may have further supply, discharge, collection and/or distribution devices which, for simplicity, are not shown in FIG. 1. It is likewise possible for a support grate without collection channels, only with support profiles, to be provided in particular below a lowermost packing.

By means of the liquid distribution device 5, it is possible to realize both a hydraulic equalization and a concentration equalization perpendicular to the central axis 3, that is to say over a cross-sectional area of the vessel 2. A hydraulic equalization is to be understood to mean a uniform liquid distribution over the cross section, and a concentration equalization is to be understood to mean an unchanging ratio of the media for separation, for example of oxygen to nitrogen, over the cross section. Along the central axis 3, in a longitudinal direction L of the vessel 2 or in the direction of gravitational force g, the result is an increasing concentration of a first medium, for example of nitrogen, and a decreasing concentration of a second medium, for example of oxygen. Also, the pressure in the vessel 2 falls in the longitudinal direction L. The liquid distribution device 5 comprises a distributor 6, for the uniform distribution of the liquid over the cross section of the vessel 2, and an inflow pipe 7, by means of which the liquid is supplied to the distributor 6. The concentration equalization is realized by means of the inflow pipe 7, because all of the liquid, which flows downward in the direction of gravitational force g, is conducted into the inflow pipe 7 and mixed there.

The mass transfer column 1 furthermore comprises a liquid collection device 8, which is likewise arranged within the vessel 2. In the orientation of FIG. 1, the liquid collection device 8 is arranged below the packing 4 with respect to the direction of gravitational force g. That is to say, the packing 4 is arranged between the liquid distribution device 5 and the liquid collection device 8. It is however possible for any desired number of packings 4 to be arranged between the liquid distribution device 5 and the liquid collection device 8. The liquid distribution device 5, the packing 4 and the liquid collection device 8 form a packing arrangement 9 of the mass transfer column 1.

The liquid collection device 8 is firstly configured for supporting the packing 4 and the liquid distribution device 5 and simultaneously catching and collecting the liquid flowing through the packing 4 downward in the direction of gravitational force g. The liquid collection device 8 can thus also be referred to as support collector or support collection unit. The liquid collection device 8 has an outflow pipe 10, by means of which the collected liquid can be discharged from the liquid collection device 8. Multiple such packing arrangements 9 may be arranged one above the other in the mass transfer column 1, such that in each case the outflow pipe 10 of a liquid collection device 8 is connected to the inflow pipe 7 of a liquid distribution device 5 arranged below the respective liquid collection device 8.

Figure 2:
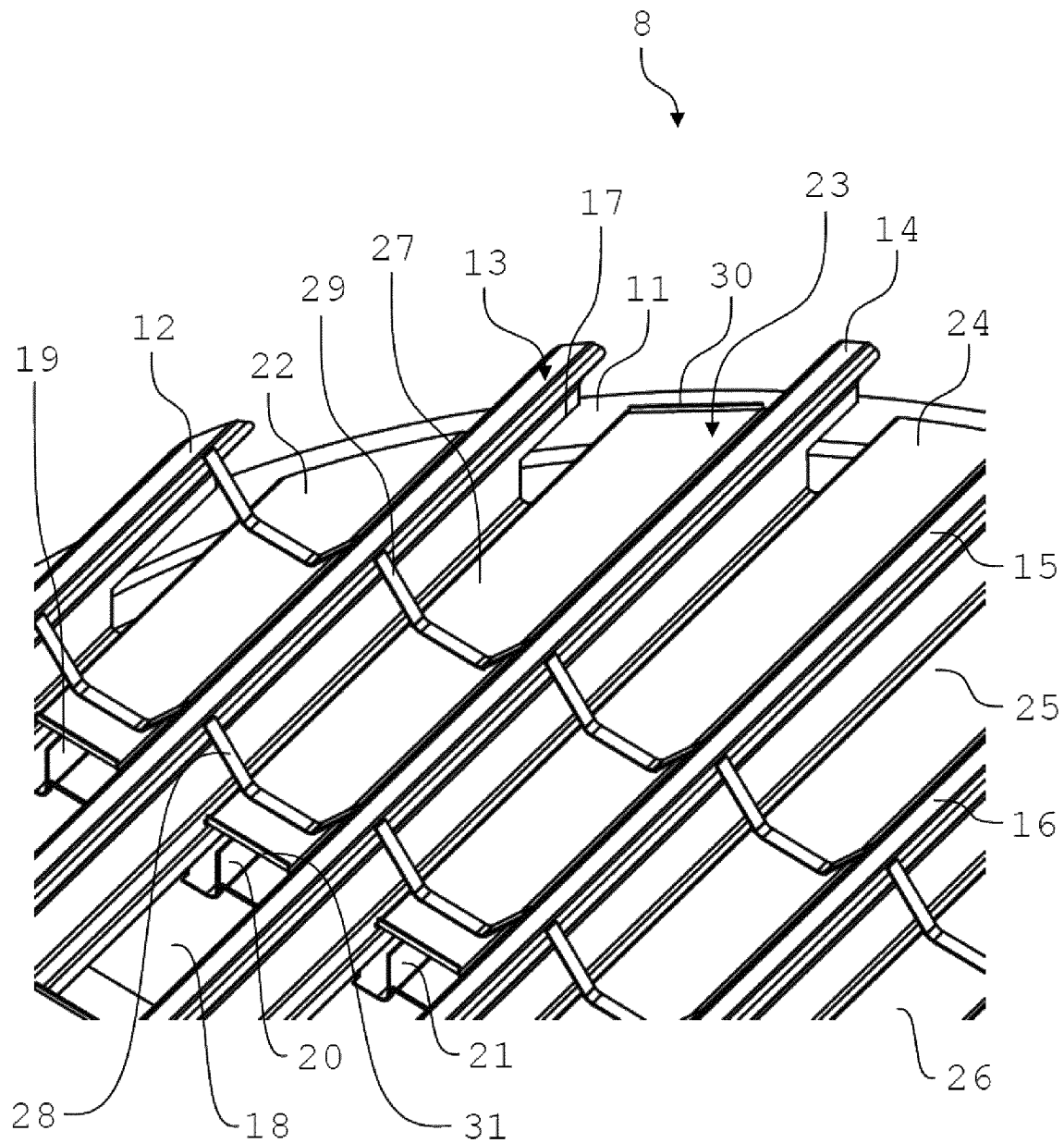
FIG. 2 shows a schematic perspective view of one embodiment of a liquid collection device for the mass transfer column according to FIG. 1.

FIG. 2 shows a schematic perspective view of one embodiment of a liquid collection device 8 for the mass transfer column 1 according to FIG. 1. The liquid collection device 8 comprises a support ring 11. The support ring 11 is a steel or aluminum ring. The support ring 11 is arranged within the vessel 2 and is fixedly connected thereto. The support ring 11 is preferably cohesively connected to an inner wall of the vessel 2. In the case of cohesive connections, the connecting partners are held together by atomic or molecular forces. cohesive connections are non-releasable connections, which can only be separated by destroying the connecting means. For example, the support ring 11 is welded to the vessel 2.

A multiplicity of support profiles 12 to 16 is provided on the support ring 11. There can be any number of support profiles 12 to 16. On the support profiles 12 to 16, there may be placed a grating, which in turn supports the packing 4. The weight force of the packing 4 is thus introduced via the support profiles 12 to 16 and the support ring 11 into the vessel 2. The support profiles 12 to 16 are arranged parallel to one another and spaced apart from one another. On each support profile 12 to 16, at the end side, there may be provided in each case one recess 17, which at least partially engages around the support ring 11. The support profiles 12 to 16 are fixedly connected to the support ring 11, for example welded thereto. The support profiles 12 to 16 may be manufactured from steel or aluminum. The support profiles 12 to 16 may be inexpensive extruded profiles.

Furthermore, the liquid collection device 8 comprises a channel-like collection tank 18, which is arranged below the support profiles 12 to 16 and is fixedly connected thereto, for example welded thereto. The collection tank 18 can be clearly seen in FIG. 1. The outflow pipe 10 is arranged centrally on the collection tank 18. Furthermore, the liquid collection device 8 comprises a multiplicity of collection channels 19 to 21. There can be any number of collection channels 19 to 21. In particular, the number of support profiles 12 to 16 corresponds to half the number of collection channels 19 to 21, such that each support profile 12 to 16 is assigned two collection channels 19 to 21. The collection channels 19 to 21 are arranged pairwise on both sides of the collection tank 18 and open into the latter. Here, the collection channels 19 to 21 are arranged with a gradient in the direction of the collection tank 18. Each support profile 12 to 16 is thus assigned a pair of collection channels 19 to 21. The liquid collection device 8 furthermore also comprises a multiplicity of cover devices 22 to 26, wherein a cover device 22 to 26 of said type is provided in each case between two adjacent support profiles 12 to 16.

The cover devices 22 to 26 comprise in each case one cover sheet 27, which may be manufactured for example from a steel sheet. The cover sheet 27 is suspended by means of multiple holding elements 28, 29 on two adjacent support profiles 12 to 16. The holding elements 28, 29 may in this case be in the form of rail-like steel profiles. The holding elements 28, 29 may for example be welded or riveted to the associated support profiles 12 to 16 and the respective cover sheet 27. The cover sheets 27 may, at the end sides, have in each case one upturned edging 30, 31. By means of the upturned edgings 30, 31, an outflow of the liquid at the end sides is prevented. The cover devices 22 to 26 cover in each case an intermediate space between two collection channels 19 to 21. The collection tank 18 is not covered by the cover devices 22 to 26. That is to say, the cover devices 22 to 26 are arranged in each case pairwise on both sides of the collection tank 18.

Figure 3:
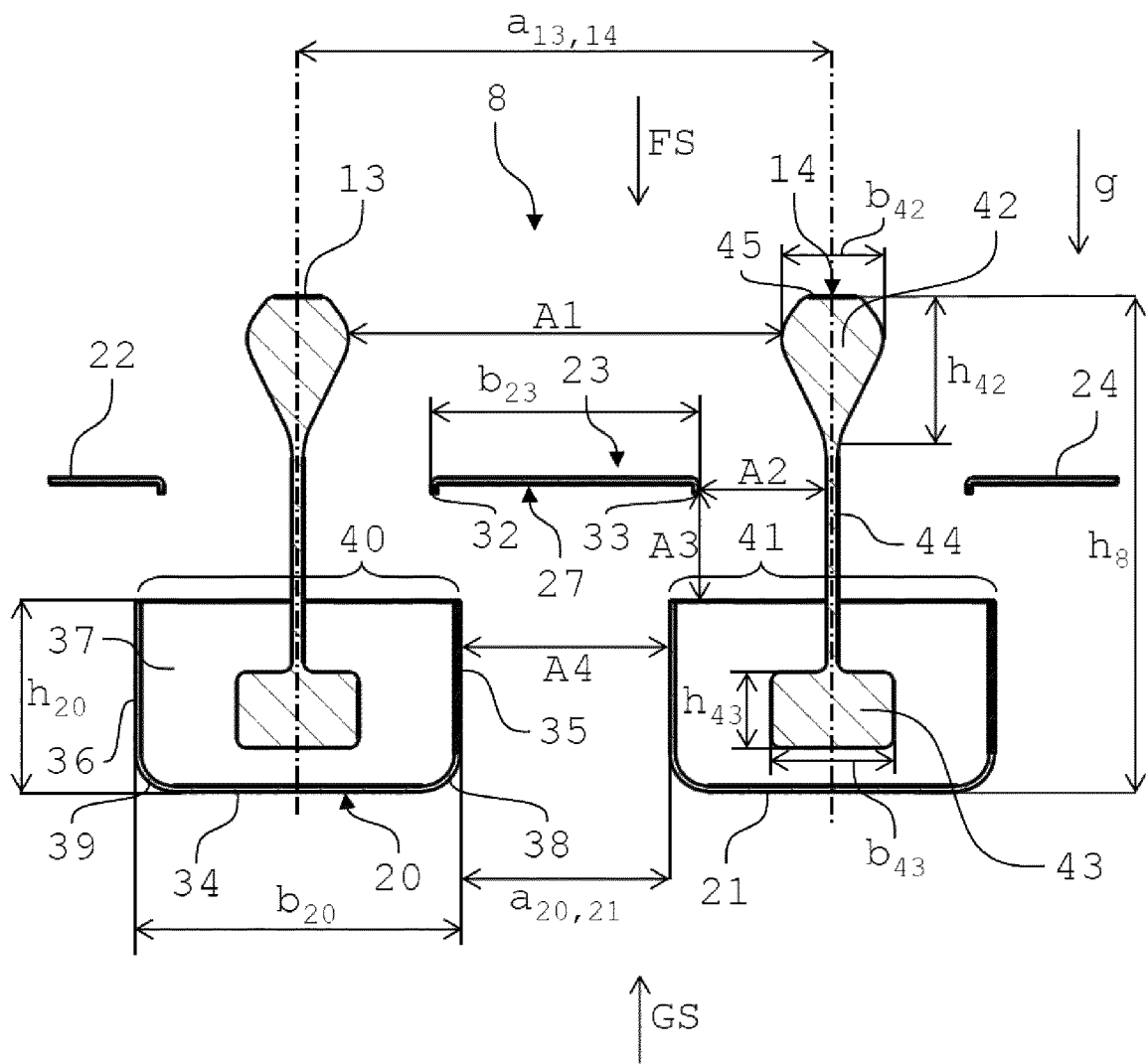
FIG. 3 shows a schematic sectional view of the liquid collection device according to FIG. 2.

FIG. 3 shows a schematic partially sectional view of the embodiment of the liquid collection device 8 according to FIG. 2. FIG. 3 shows only two support profiles 13, 14, two collection channels 20, 21 and three cover devices 22 to 24, to which reference will be made below.

As shown in FIG. 3, the cover sheets 27 laterally have in each case downturned edgings 32, 33, which point in the direction of the collection channels 20, 21. Each collection channel 20, 21 is U-shaped in cross section and comprises a base 34, a first side wall 35 and a second side wall 36 which is arranged parallel to and spaced apart from the first side wall 35. Facing toward the support ring 11, that is to say facing away from the collection tank 18, the collection channels 20, 21 are closed off in fluid-tight fashion at the end side by means of a closure sheet 37. The collection channels 20, 21 are designed for example as bent sheet parts. In particular, the collection channels 20, 21 may be manufactured from a steel sheet. Transitions 38, 39 between the side walls 35, 36 and the base 34 may be rounded. Each collection channel 20, 21 may have a height $h_{20}$ and a width $b_{20}$. A spacing $a_{20,\,21}$ may be provided between adjacent collection channels 20, 21. The liquid collection device 8 has a height $h_8$. The cover device 23 may for example have a width $b_{23}$. A spacing $a_{13,\,14}$ is provided between two adjacent support profiles 13, 14.

A liquid flow FS flows through the liquid collection device 8 in the direction of gravitational force g. A gas flow GS flows through the liquid collection device 8 counter to the direction of gravitational force g. The gas flow GS may also be referred to as vapor flow. During the operation of the mass transfer column 1, the liquid flow FS comes into contact repeatedly in succession with the gas flow GS in a countercurrent configuration. In this way, as already discussed above, the mass transfer column 1 operates more efficiently in terms of energy, is technically less complex and is more space-saving than an arrangement of single distillations one after the other.

The collection channels 20, 21 are designed to generate in each case a flow shadow 40, 41 in the gas flow GS flowing through the liquid collection device 8 counter to the direction of gravitational force g. A flow shadow 40, 41 or wind shadow is a zone of relatively low flow speed on a downstream side of a flow obstruction, in this case of the collection channels 20, 21. That is to say, the collection channels 20, 21 prevent the direct impingement of the gas flow GS on an object arranged behind or downstream of the collection channels 20, 21 in the flow direction of the gas flow GS. The support profiles 13, 14 are arranged in each case in the flow shadow 40, 41 of the collection channels 20, 21 assigned thereto. That is to say, the support profiles 13, 14 are not directly impinged on by the gas flow GS.

Each support profile 13, 14 is I-shaped or double-T-shaped in cross section. In particular, the support profiles 13, 14 are I beams or double-T beams. Each support profile 13, 14 comprises a first flange 42 and a second flange 43 arranged spaced apart from the first flange 42. Between the flanges 42, 43, there is arranged a web 44 which connects said flanges. The flanges 42, 43 and the web 44 are formed materially integrally, that is to say in one piece. A width of the web 44 is smaller than a respective width of the flanges 42, 43. The second flange 43 may be rectangular in cross section, with a width $b_{43}$ and a height $h_{43}$.

The first flange 42 may be droplet-shaped in cross section and narrow in the direction of gravitational force g. This gives rise to a particularly streamlined geometry. Narrowing is to be understood to mean that the cross section of the second flange 42 becomes smaller in the direction of gravitational force g. A droplet-shaped cross section is to be understood in the present case to mean a cross section which narrows from a first end section in the direction of a second end section. Here, the cross section may also have rounded portions. At its widest point, the first flange 42 has a width $b_{42}$. The width $b_{42}$ may be smaller than the width $b_{43}$ of the second flange 43. The first flange 42 has a height $h_{42}$ which may be greater than the height $h_{43}$ of the second flange 43. The second flange 43 may be designed in cross section such that a spacing of a center of gravity of a cross-sectional area of the support profiles 13, 14 to the respective center of gravity of the first flange 42 and of the second flange 43 is equal, whereby the respective support profile 13, 14 is optimized with regard to the accommodation of bending stresses. The second flange 42 may furthermore have a planar end side 45 averted from the respective collection channel 20, 21. The grating on which the packing 4 is placed lies on the end side 45. The grating distributes the weight of the packing 4 between the support profiles 13, 14.

A first passage area A1 is provided between the adjacent support profiles 13, 14. A second passage area A2 is provided between the web 44 of the respective support profile 13, 14 and the cover sheet 27. A third passage area A3 is provided between the respective downturned edging 32, 33 of the cover sheet 27 and the respective collection channel 20, 21. A fourth passage area A4 is provided between two adjacent collection channels 20, 21. The fourth passage area A4 has a width corresponding to the spacing $a_{20, 21}$.

During the operation of the mass transfer column 1, the gas flow GS flows, counter to the direction of gravitational force, through the passage areas A4, A3, A2 and A1 in succession. At the same time, in the opposite direction, that is to say in countercurrent, the liquid flow FS flows into the collection channels 20, 21 through the passage areas A1 and A2 in succession. Here, the liquid impinges on the support profiles 13, 14 and the cover device 23 and is diverted by these into the collection channels 20, 21, which in turn supply the liquid to the collection tank 18.

The support profiles 13, 14 are arranged in each case at least in sections between the side walls 35, 36 of the collection channels 20, 21 assigned thereto. In particular, the support profiles 13, 14 are arranged at least in sections within the collection channel 20, 21 assigned to the respective support profile 13, 14. More specifically, at least the second flange 43 of the respective support profile 13, 14 is arranged entirely within the respective collection channel 20, 21.

By virtue of the fact that the support profiles 13, 14 are arranged in the flow shadow 40, 41 of the collection channels 20, 21 assigned thereto and not between these, said support profiles do not constitute a flow obstruction for the gas flow GS. In this way, the liquid collection device 8 has a lower flow resistance than known liquid collection devices. The flow resistance is also reduced by virtue of the fact that the collection channels 20, 21 are rounded by means of the transitions 38, 39, and that the first flange 42 of the support profiles 13, 14 has a flow-optimized geometry.

The flexural stiffness of the support profiles 13, 14 is much higher than that of profiles used in known liquid collection devices, because the height $h_{20}$ of the collection channels 20, 21 can be utilized for accommodating the support profiles 13, 14. In relation to trapezoidal profiles or cross-shaped profiles that are often used, the support profiles 13, 14 exhibit a much higher flexural stiffness, while being of approximately the same weight. In relation to known liquid collection devices, it is also possible to realize a particularly low height $h_8$ of the liquid collection device 8. The second passage area A2 is furthermore not constricted by the holding elements 28, 29.

Figure 4:
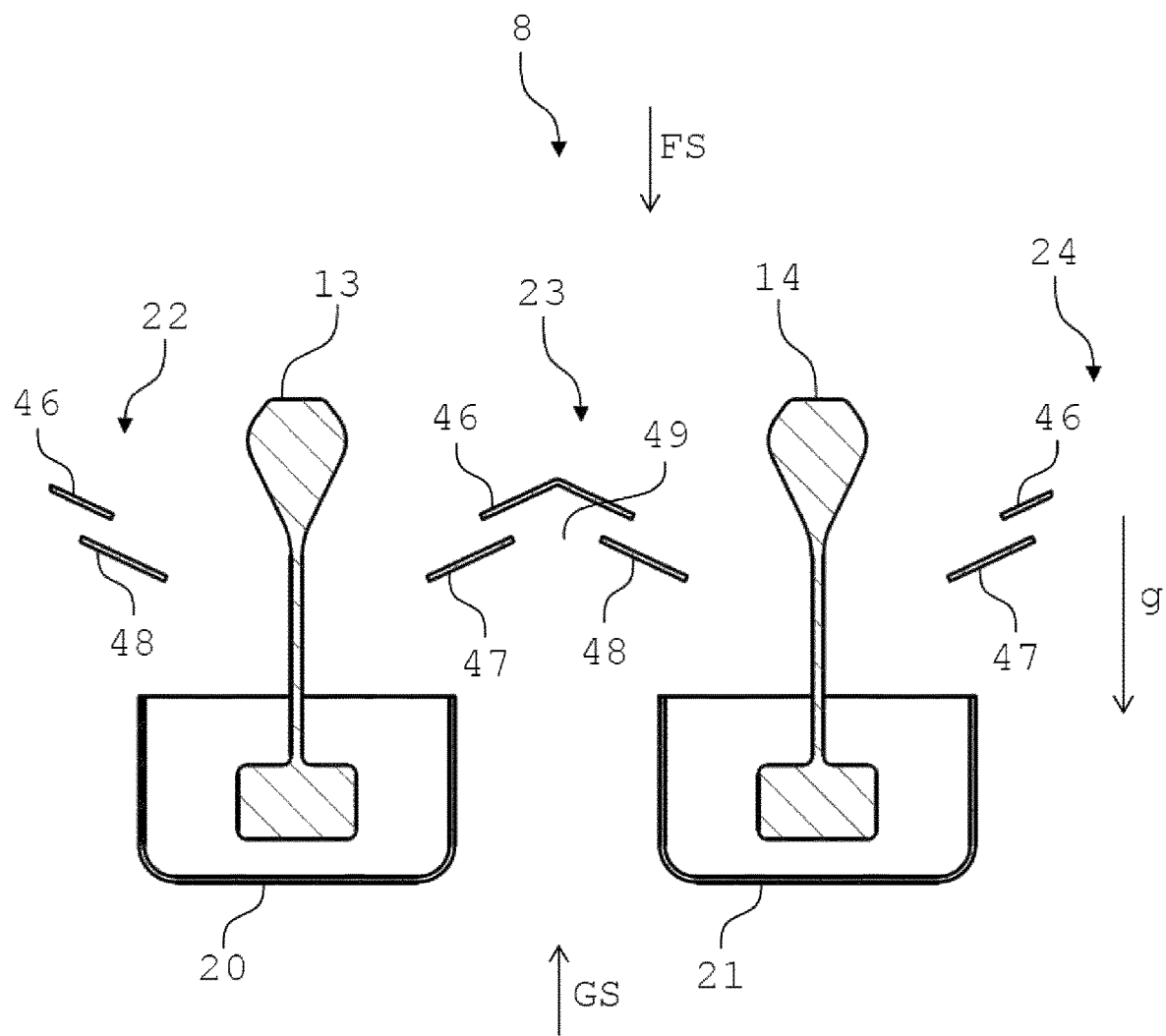
FIG. 4 shows a schematic sectional view of a further embodiment of a liquid collection device for the mass transfer column according to FIG. 1.

FIG. 4 shows a schematic partially sectional view of a further embodiment of a liquid collection device 8. The liquid collection device 8 according to FIG. 4 differs from the liquid collection device 8 according to FIG. 3 by an alternative design of the cover devices 22 to 24. Each cover device 22 to 24 comprises an upper or first cover sheet 46, which is bent into a roof shape. Below the upper cover sheet 46 in the direction of gravitational force g, there are provided two lower or second cover sheets 47, 48, which are spaced apart from one another and which are likewise arranged in a roof shape. An additional gas passage 49 is provided between the second or lower cover sheets 47, 48. By means of the roof-shaped design of the cover sheets 46, 47, 48, a particularly good outflow of the liquid into the collection channels 20, 21 is realized. By means of the roof-shaped construction with the additional gas passage 49, it is possible to realize a larger gas passage through the liquid collection device 8.

Figure 5:
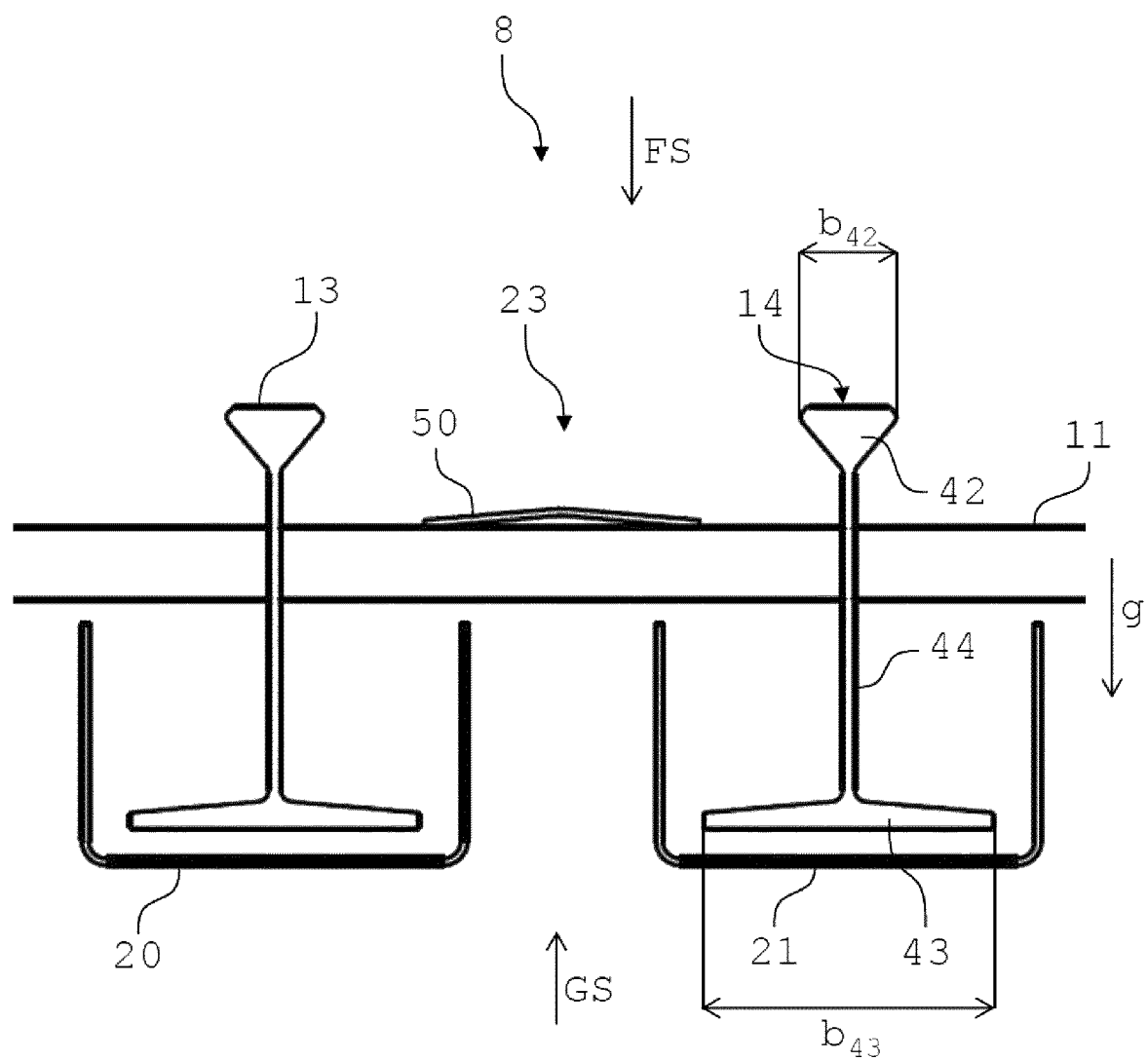
FIG. 5 shows a schematic sectional view of a further embodiment of a liquid collection device for the mass transfer column according to FIG. 1.
Figure 6:
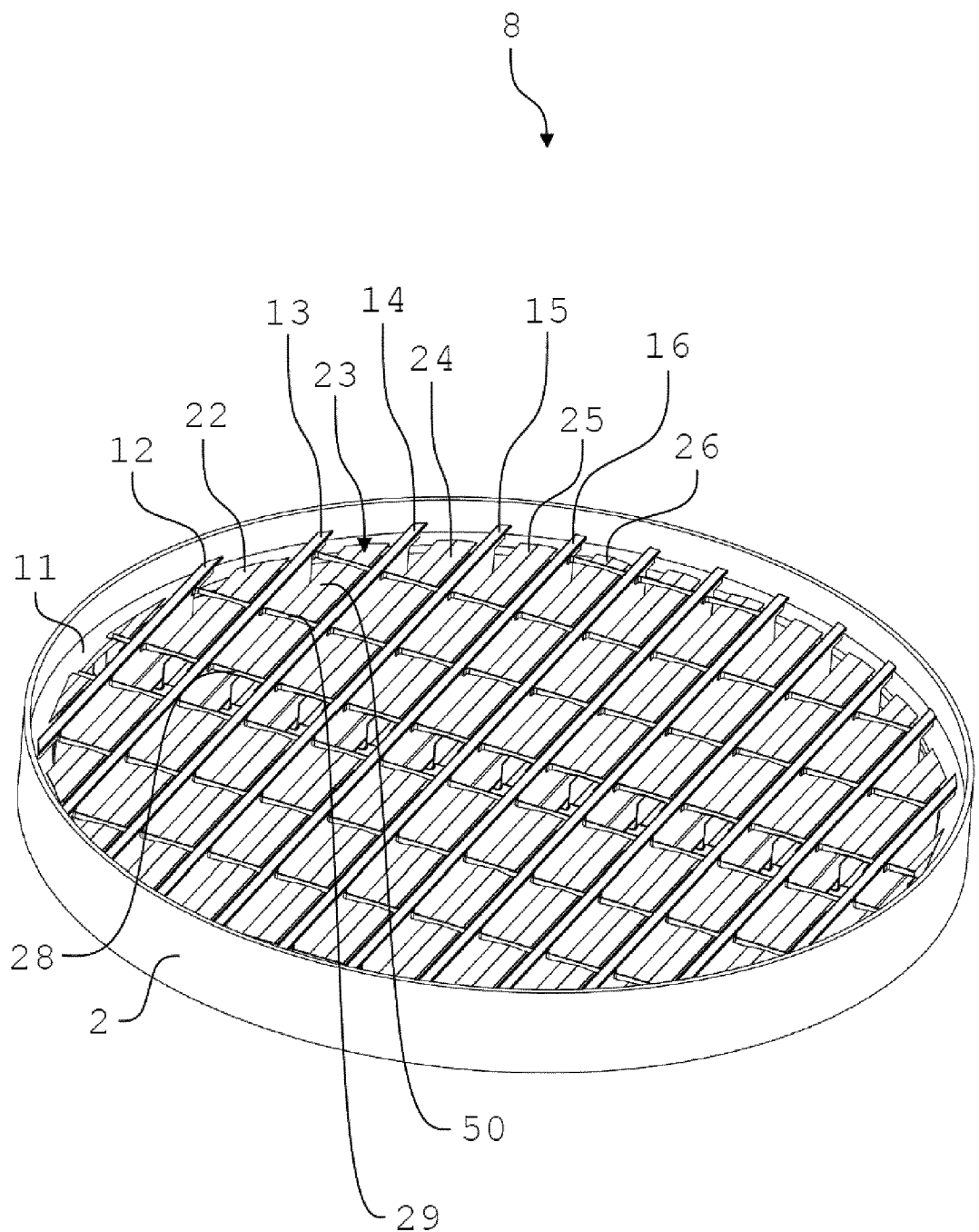
FIG. 6 shows a schematic perspective view of the liquid collection device according to FIG. 5.

FIG. 5 shows a schematic partially sectional view of a further embodiment of a liquid collection device 8, and FIG. 6 shows a schematic perspective view of said liquid collection device 8. The liquid collection device 8 according to FIGS. 5 and 6 differs from the liquid collection device 8 according to FIG. 3 in that the cover device 23 comprises a cover sheet 50 bent into a roof shape, and in that the support profiles 13, 14 have a modified cross section. The support profiles 13, 14 according to FIG. 5 differ from the support profiles 13, 14 according to FIG. 3 in that the second flange 43, which is arranged within the respective collection channel 20, 21, is of strip-shaped form rather than cuboidal form. Furthermore, the width $b_{43}$ of the second flange 43 is much greater than the width $b_{42}$ of the first flange 42. The top side of the flange 43 has a gradient, such that liquid can flow off into the collection channel 20, 21. The first flange 42 likewise narrows in the direction of gravitational force g, and has a triangular geometry in cross section. By means of the triangular geometry of the first flange 42, the defining second passage area A2 can be enlarged.

As shown in FIG. 6, the cover sheets 50 of the cover devices 22 to 26 are welded sealingly to the support ring 11.

Figure 7:
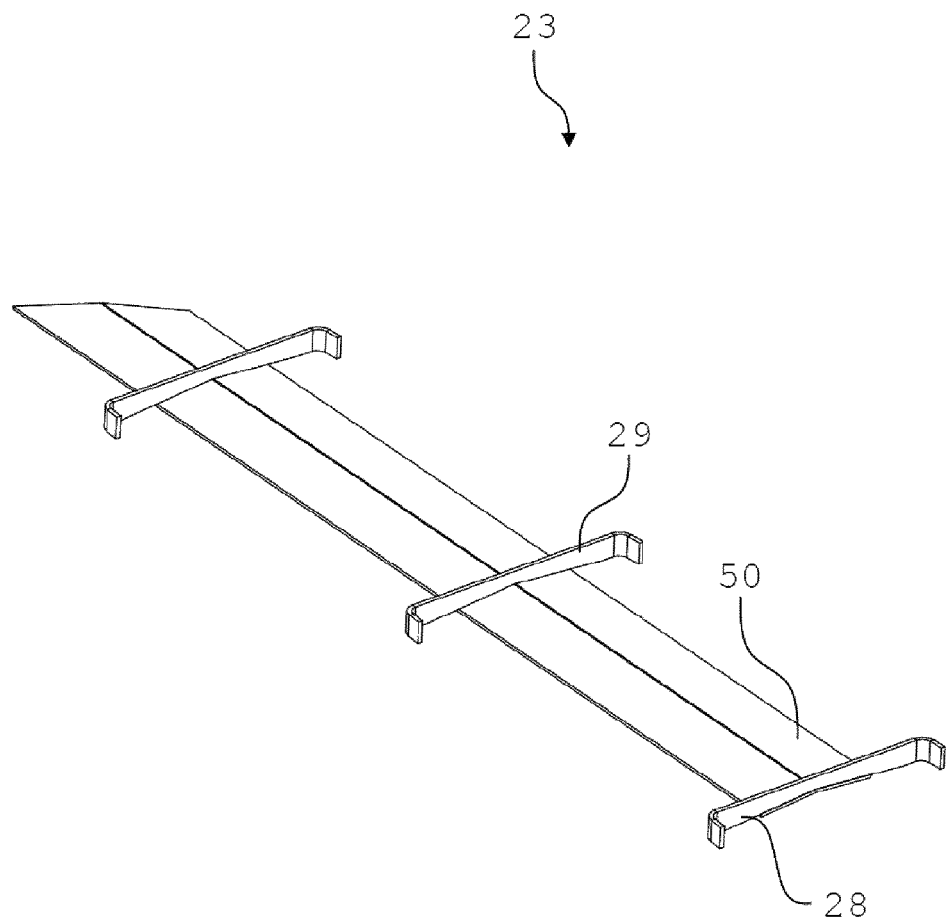
FIG. 7 shows a schematic perspective view of one embodiment of a cover device for the liquid collection device according to FIG. 5.

At the side of the collection tank 18, the holding element 28 is welded to the cover sheet 50 at the end thereof, as shown in FIG. 7 in a schematic perspective view of the cover device 23. In this way, it is possible to dispense with the upturned edging 31, shown in FIG. 2, at the end of the cover sheet 50.

Figure 8:
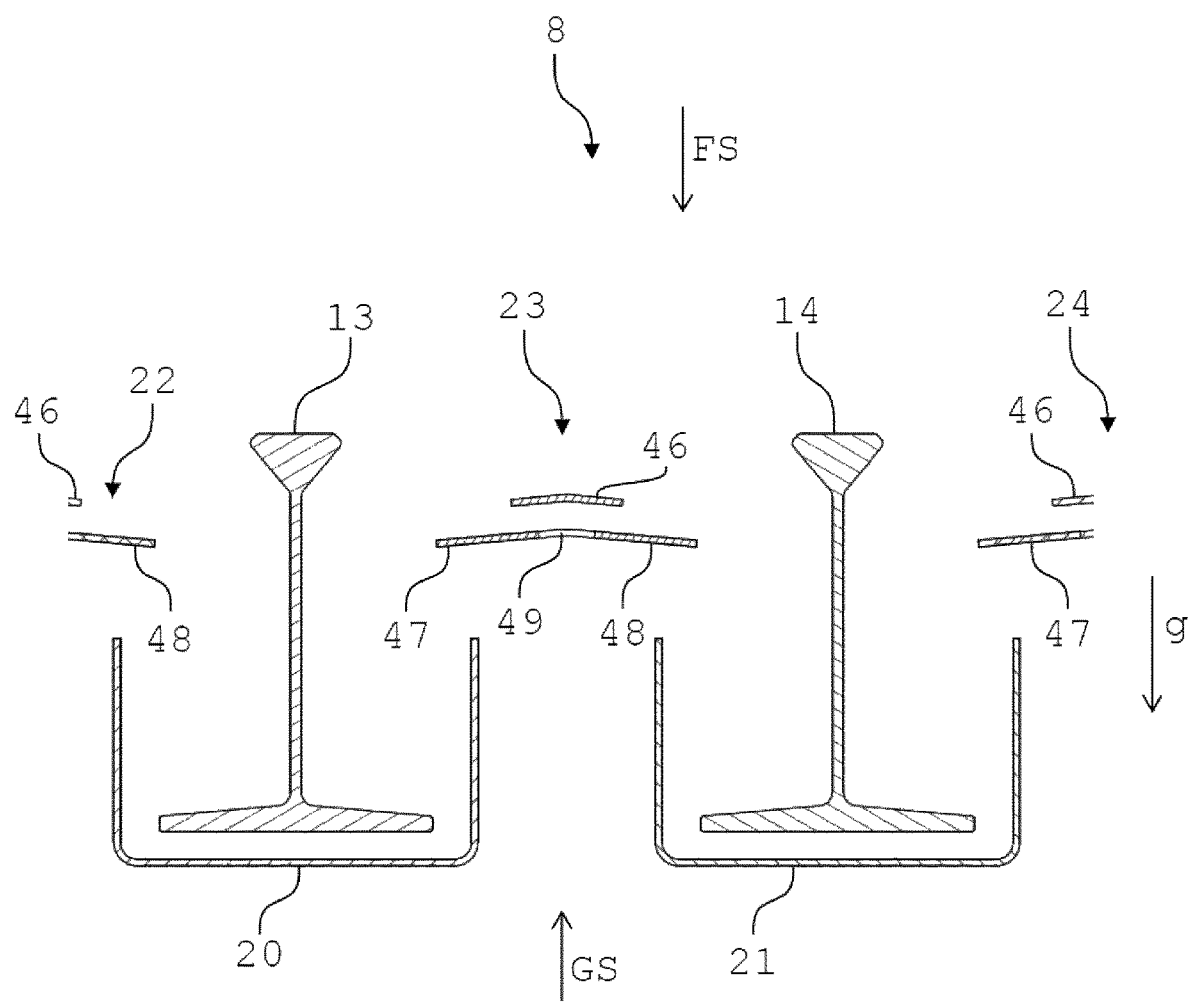
FIG. 8 shows a schematic sectional view of a further embodiment of a liquid collection device for the mass transfer column according to FIG. 1.
Figure 9:
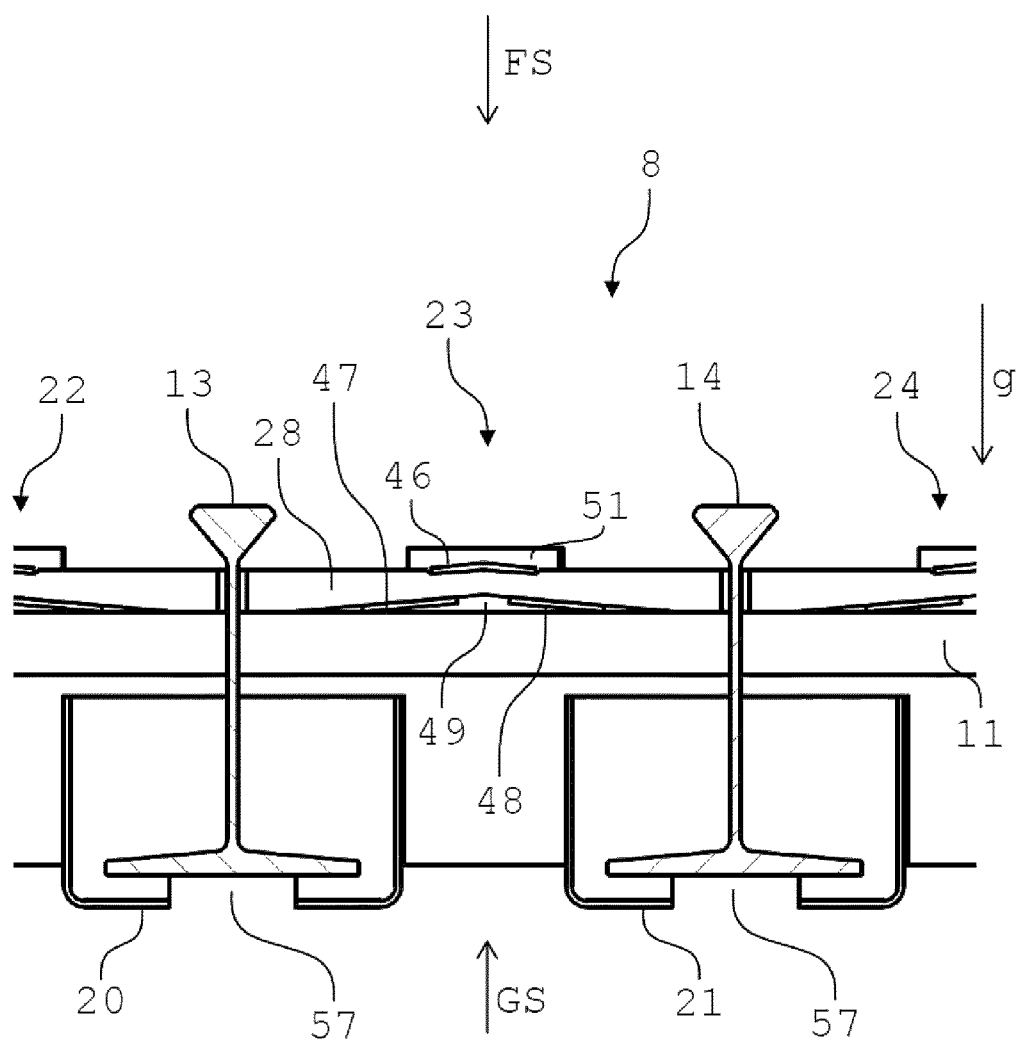
FIG. 9 shows a further schematic sectional view of the liquid collection device according to FIG. 8.
Figure 10:
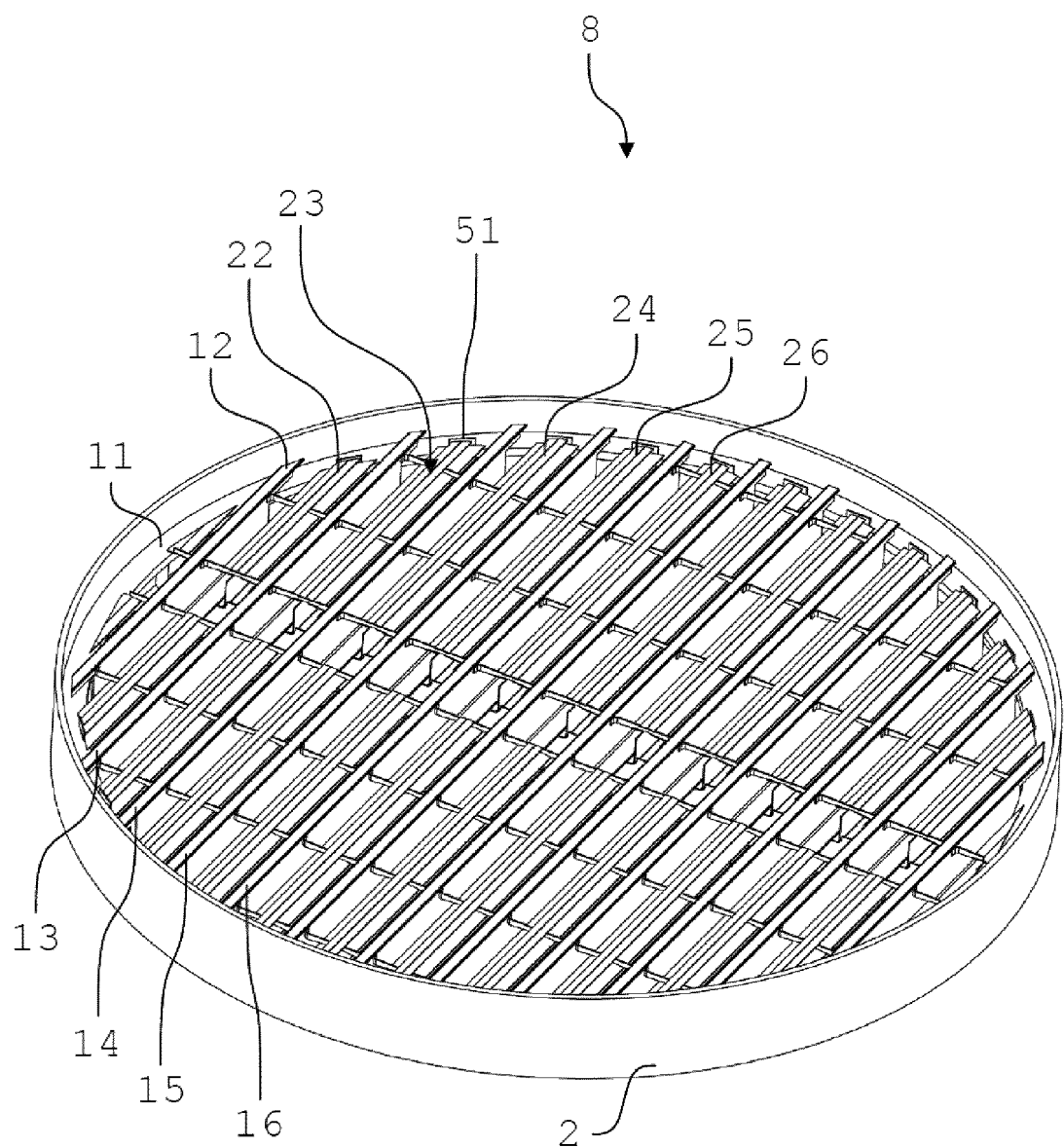
FIG. 10 shows a schematic perspective view of the liquid collection device according to FIG. 8.
Figure 11:
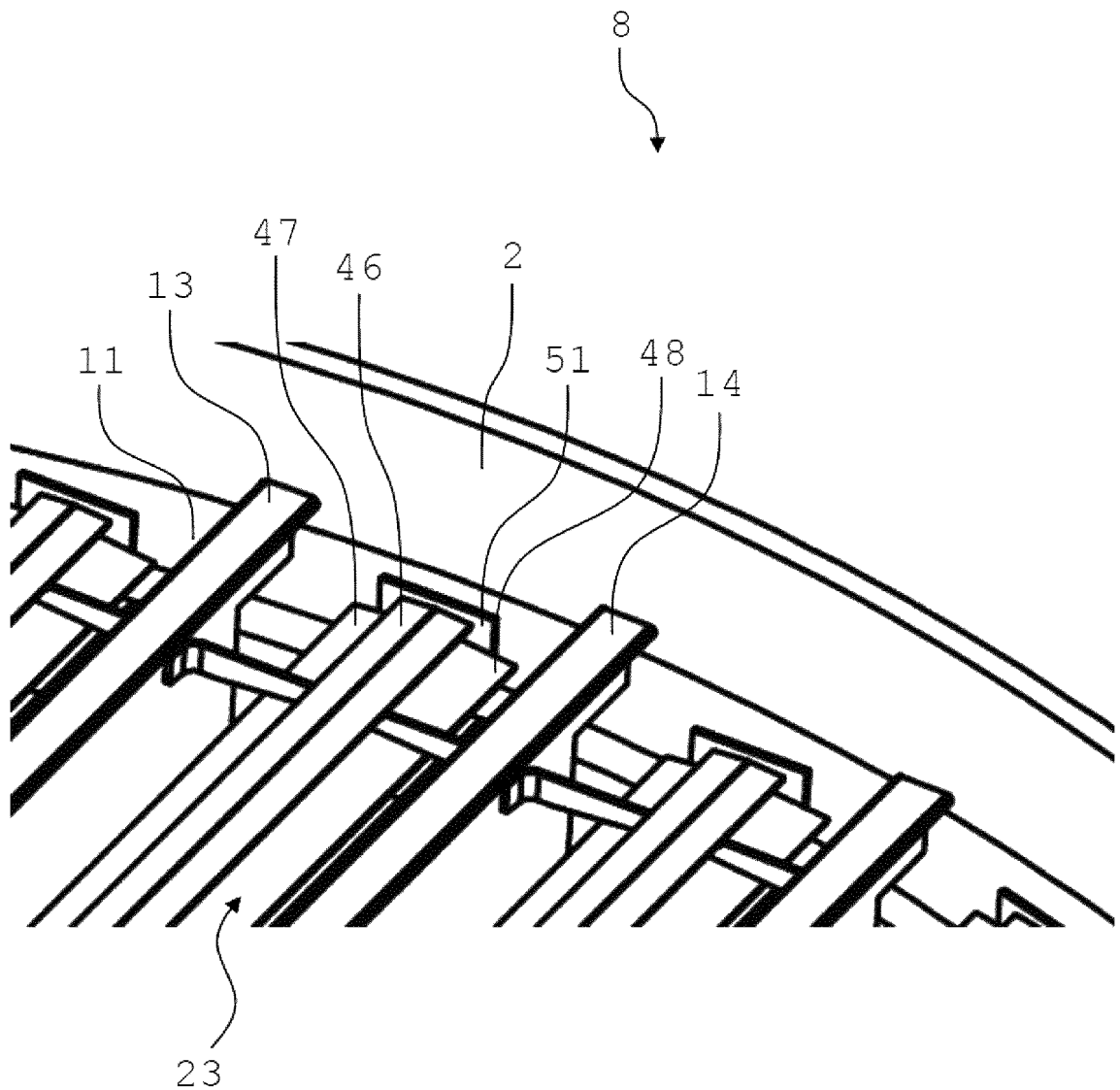
FIG. 11 shows a further schematic perspective view of the liquid collection device according to FIG. 8.
Figure 12:
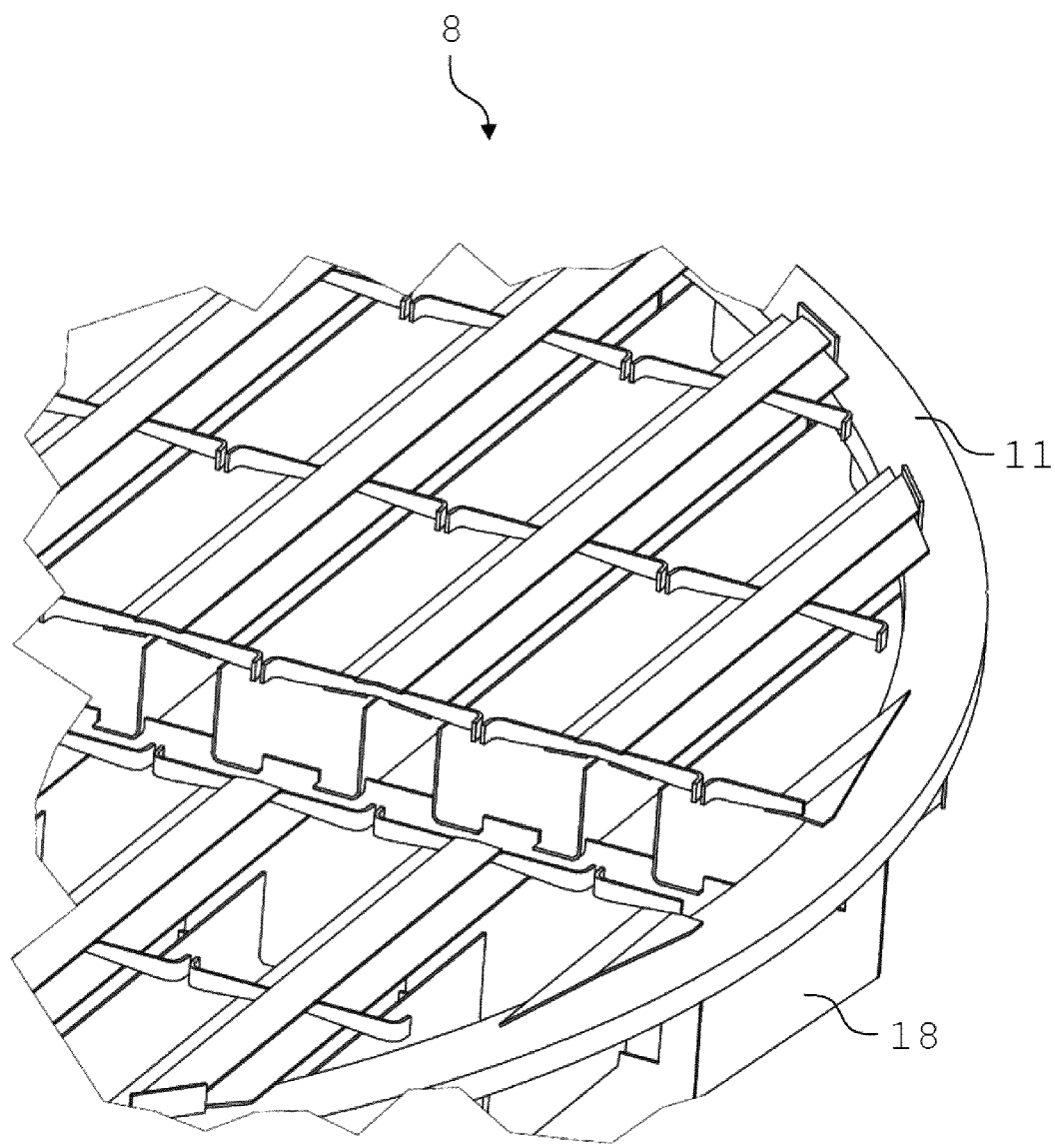
FIG. 12 shows a further schematic perspective view of the liquid collection device according to FIG. 8.
Figure 13:
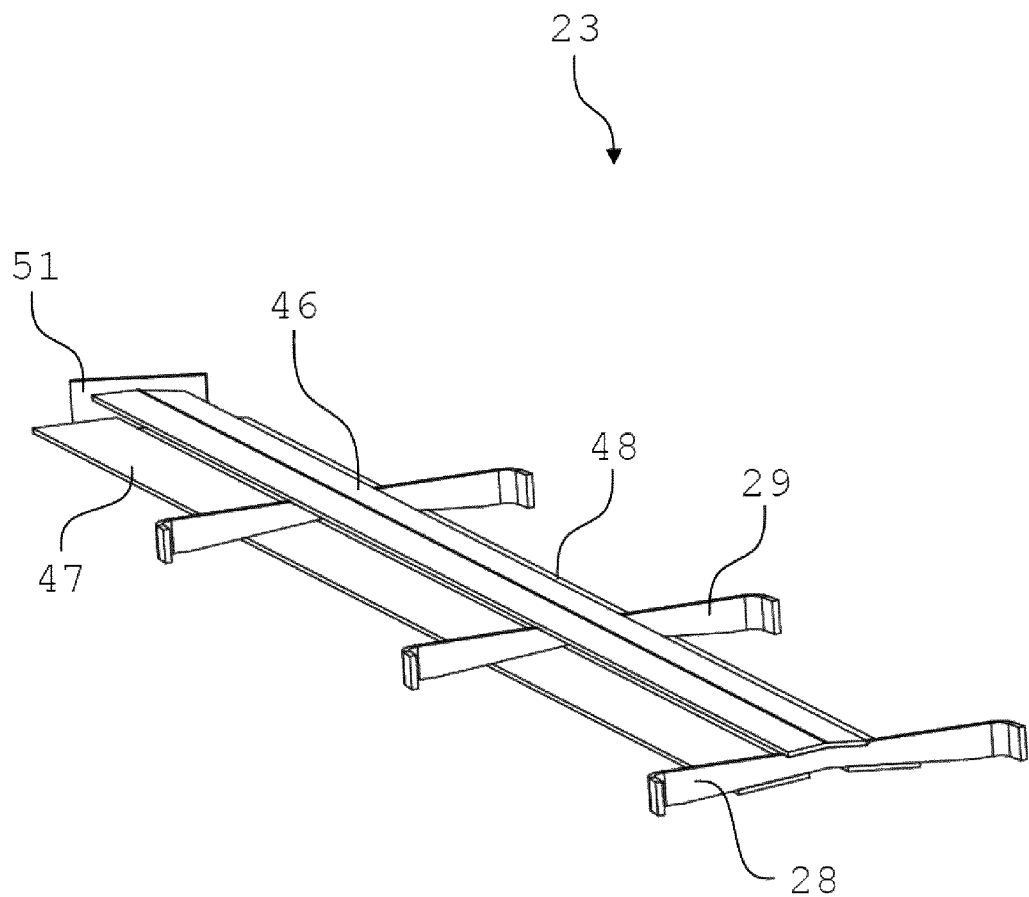
FIG. 13 shows a schematic perspective view of one embodiment of a cover device for the liquid collection device according to FIG. 8.

FIGS. 8 and 9 each show a schematic partially sectional view of a further embodiment of a liquid collection device 8. FIGS. 10 to 12 each show schematic perspective views of said liquid collection device 8, and FIG. 13 shows a schematic perspective view of a cover device 23. The support profiles 12 to 16 are not shown in FIG. 12.

The embodiment of the liquid collection device 8 according to FIGS. 8 to 12 differs from the liquid collection device 8 according to FIGS. 5 and 6 in that the cover devices 22 to 24 each have an upper or first roof-shaped, bent cover sheet 46 and two lower or second cover sheets 47, 48 which are arranged below the first cover sheet 46 in the direction of gravitational force g and which have a central gas passage 49. By means of the double roof-shaped design of the cover devices 22 to 24, it is possible to realize a significant improvement with regard to the flow resistance, because the gas can flow directly from the fourth passage area A4 upward through the gas passage 49 counter to the direction of gravitational force g.

The cover devices 22 to 24 comprise not only the cover sheets 46, 47, 48 bent into a roof shape but also at least one holding element 28, 29, to which the cover sheets 46, 47, 48 are welded. At the end side, that is to say facing toward the support ring 11, the cover devices 22 to 24 furthermore comprise a termination sheet 51 which is welded to the cover sheets 46, 47, 48 and which prevents a flow of the liquid to the support ring 11. Furthermore, the termination sheet 51 prevents liquid that is situated on the support ring 11 from being able to flow out between the collection channels 20, 21. In this way, it is possible to dispense with the upturned edging 30 shown in FIG. 2. The termination sheet 51 is welded sealingly to the support ring 11 and to the respective cover device 23 to 26. The holding element 28 is, by contrast to the holding element 28 according to FIG. 2, arranged upright, whereby the flow resistance thereof is reduced.

Figure 14:
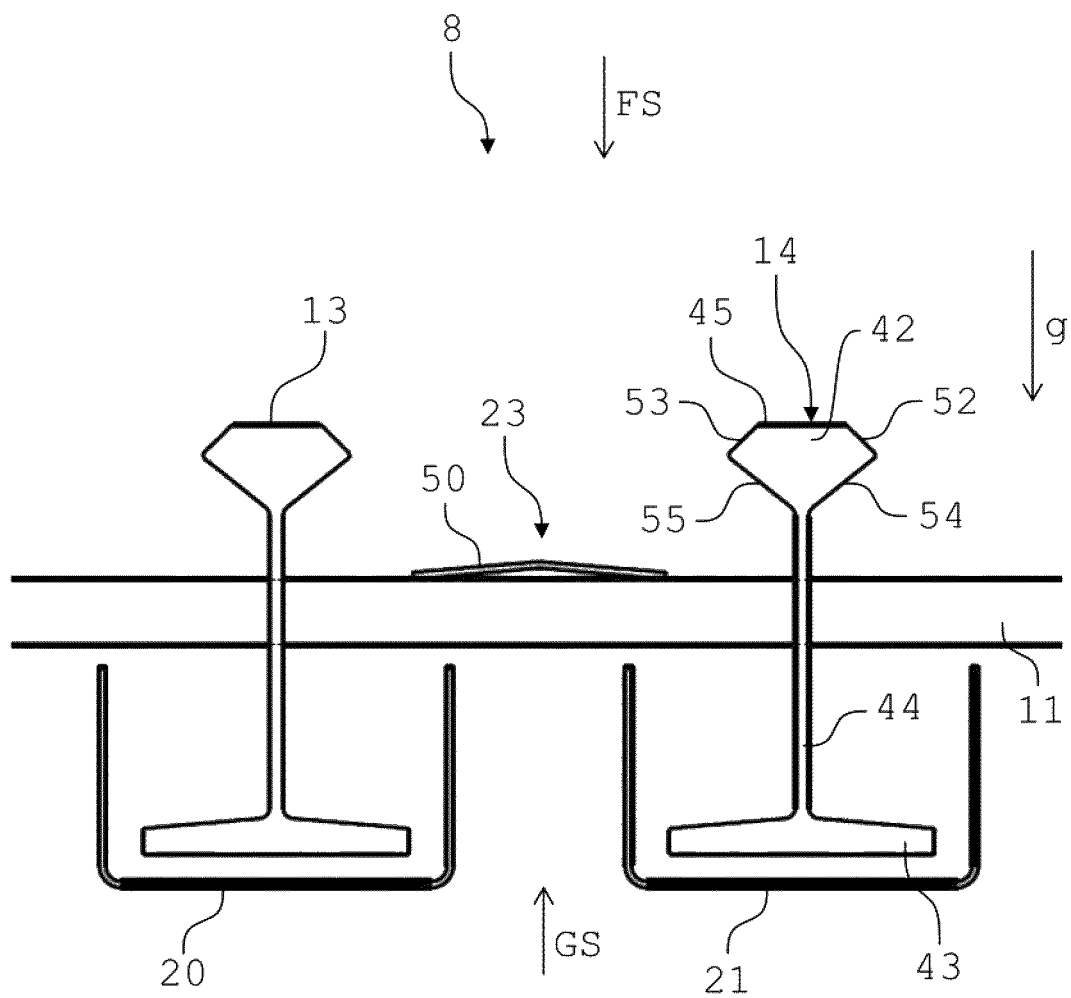
FIG. 14 shows a schematic sectional view of a further embodiment of a liquid collection device for the mass transfer column according to FIG. 1.

FIG. 14 shows a schematic sectional view of a further embodiment of a liquid collection device 8. The liquid collection device 8 according to FIG. 8 differs from the liquid collection device 8 according to FIGS. 5 and 6 merely in that the support profiles 13, 14 have a changed cross-sectional geometry. In this embodiment of the liquid collection device 8, the first flange 42 of the support profiles 13, 14 is of not triangular but rather pentagonal or diamond-shaped design. In particular, the first flange 42 comprises the end side 45 averted from the respective collection channel 20, 21, two first side walls 52, 53 running obliquely away from the end side 45, and two second side walls 54, 55 which adjoin the first side walls 52, 53 and which run in the direction of the web 44. By means of the first side walls 52, 53, it is possible to realize a particularly good outflow of the liquid into the collection channels 20, 21 and at the same time a good impingement of flow on the packing 4 situated thereabove. The cross section of the first flange 42 has a particularly low flow resistance.

FIGS. 15 to 20 show an embodiment of a method for producing a mass transfer column 1 of said type or for producing a liquid collection device 8 of said type. Reference is made below to FIGS. 15 to 20 simultaneously.

In a first step S1, the vessel 2, the support ring 11, a multiplicity of support profiles 12 to 16 and a multiplicity of collection channels 19 to 21 are provided or produced. Here, the vessel 2 may be constructed from a multiplicity of vessel sections or shell sections. In a step S2, the support ring 11 can be arranged within the vessel 2. Here, the support ring 11 may be welded to an inner wall of the vessel 2. Alternatively, the support ring 11 may also, after the completion of the liquid collection device 8, be lifted as a unit together with the latter into the vessel 2 and then fixedly connected to said vessel.

Figure 15:
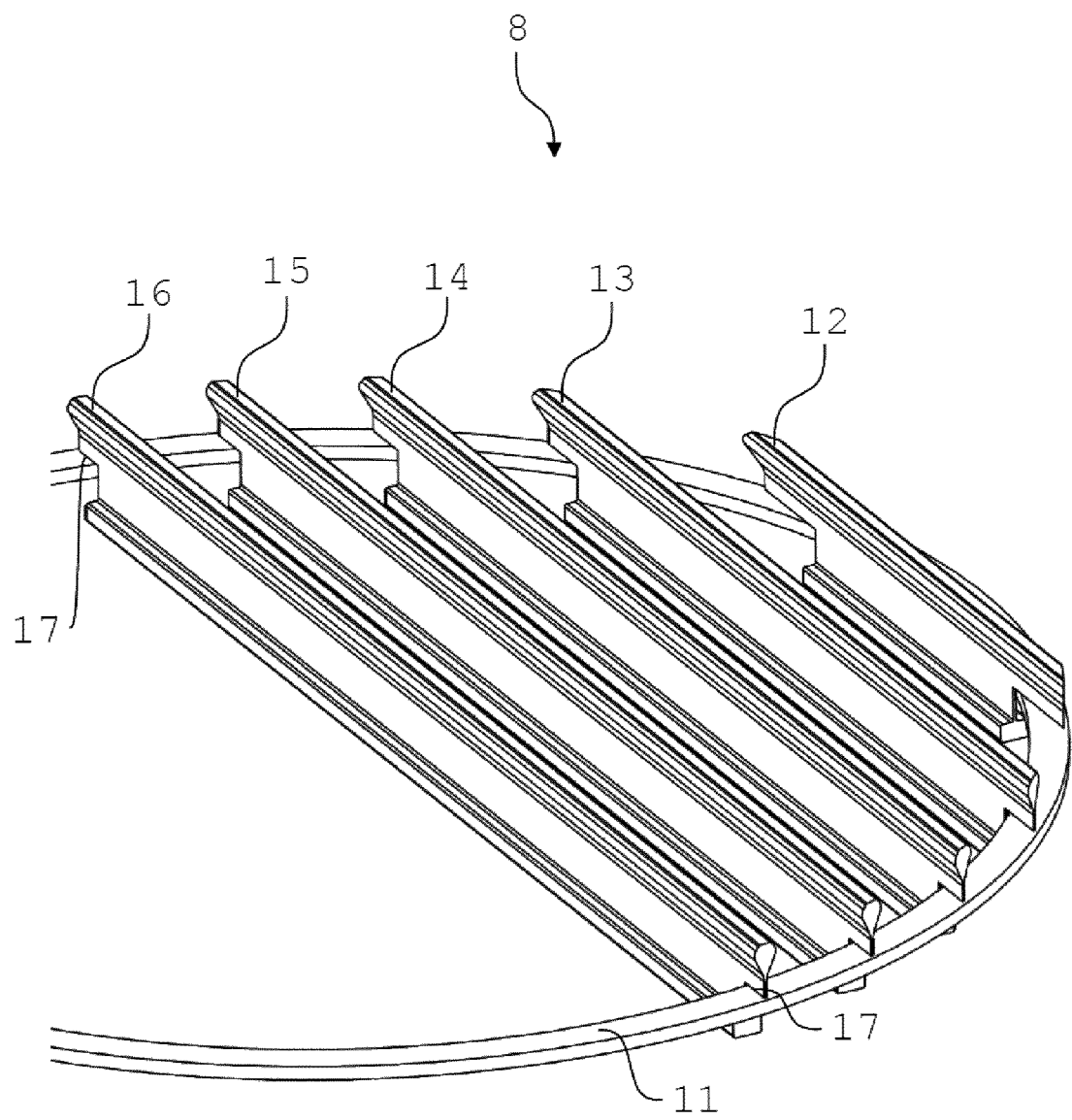
FIG. 15 shows a schematic perspective view of the liquid collection device according to FIG. 2 during the assembly process.
Figure 16:
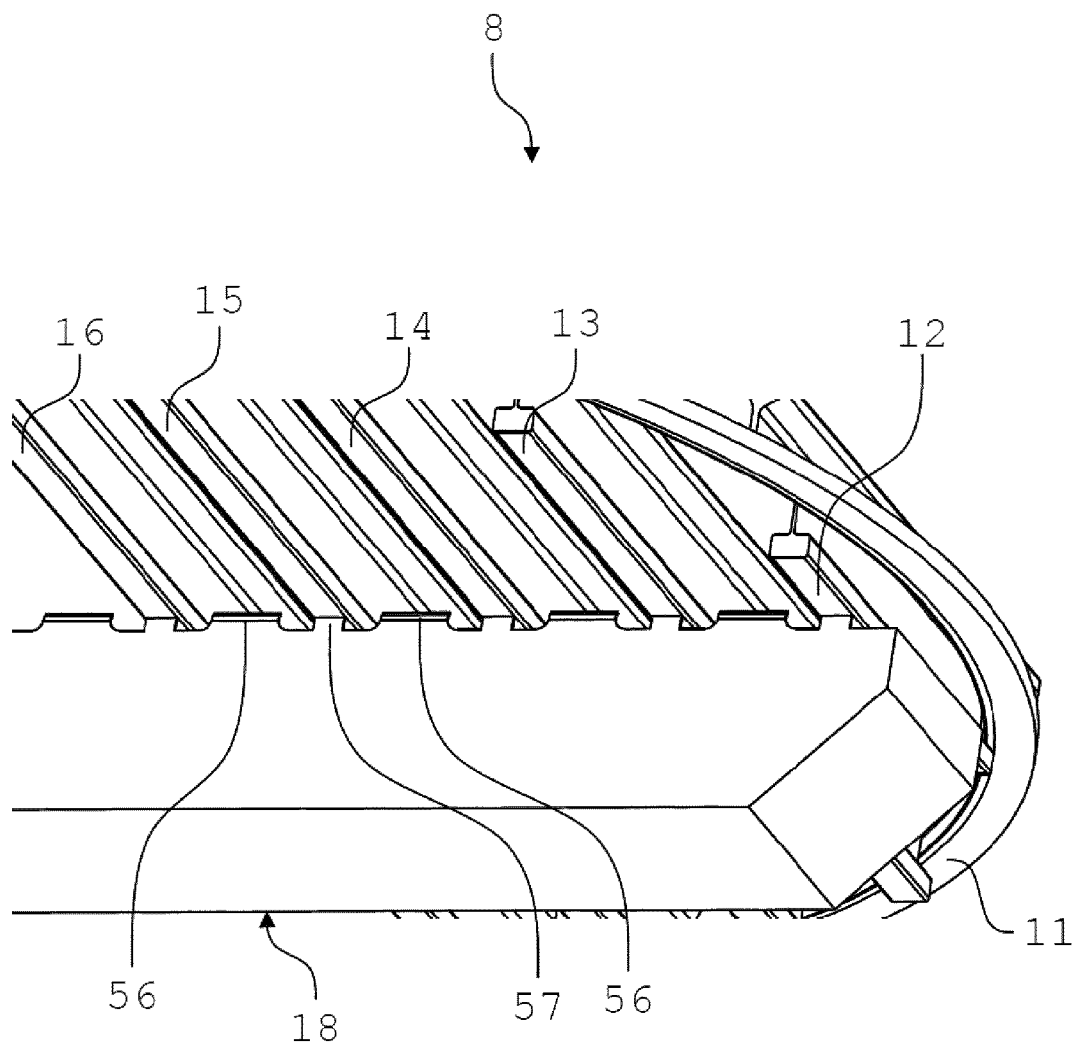
FIG. 16 shows a further schematic perspective view of the liquid collection device according to FIG. 2 during the assembly process.

In a step S3, the support profiles 12 to 16 are arranged on the support ring 11 and fixedly connected thereto, for example welded thereto, as shown in FIG. 15. For this purpose, the corresponding recesses 17 for the support ring 11 are provided on the support profiles 12 to 16. The recesses 17 may be omitted if the support profiles 12 to 16 are used as a support grate without collection characteristics. In this case, the support ring 11 can be arranged at a correspondingly low level. The support profiles 12 to 16 are positioned parallel to one another. In a step S4, as shown in FIG. 16, the collection tank 18 is mounted from below onto the support profiles 12 to 16, and in particular is welded on. Tank sheet projecting lengths 56 provided between the collection channels 19 to 21 that are to be mounted at a later point in time may be bent in the direction of an inner side of the collection tank 18 in order to make it easier for the gas flow GS flowing from bottom to top to pass through to the open region above the collection tank 18, and thus reduce the flow resistance. Here, between two tank sheet projecting lengths 56, there is provided in each case one web 57 for the fastening of a respective collection channel 19 to 21.

Figure 17:
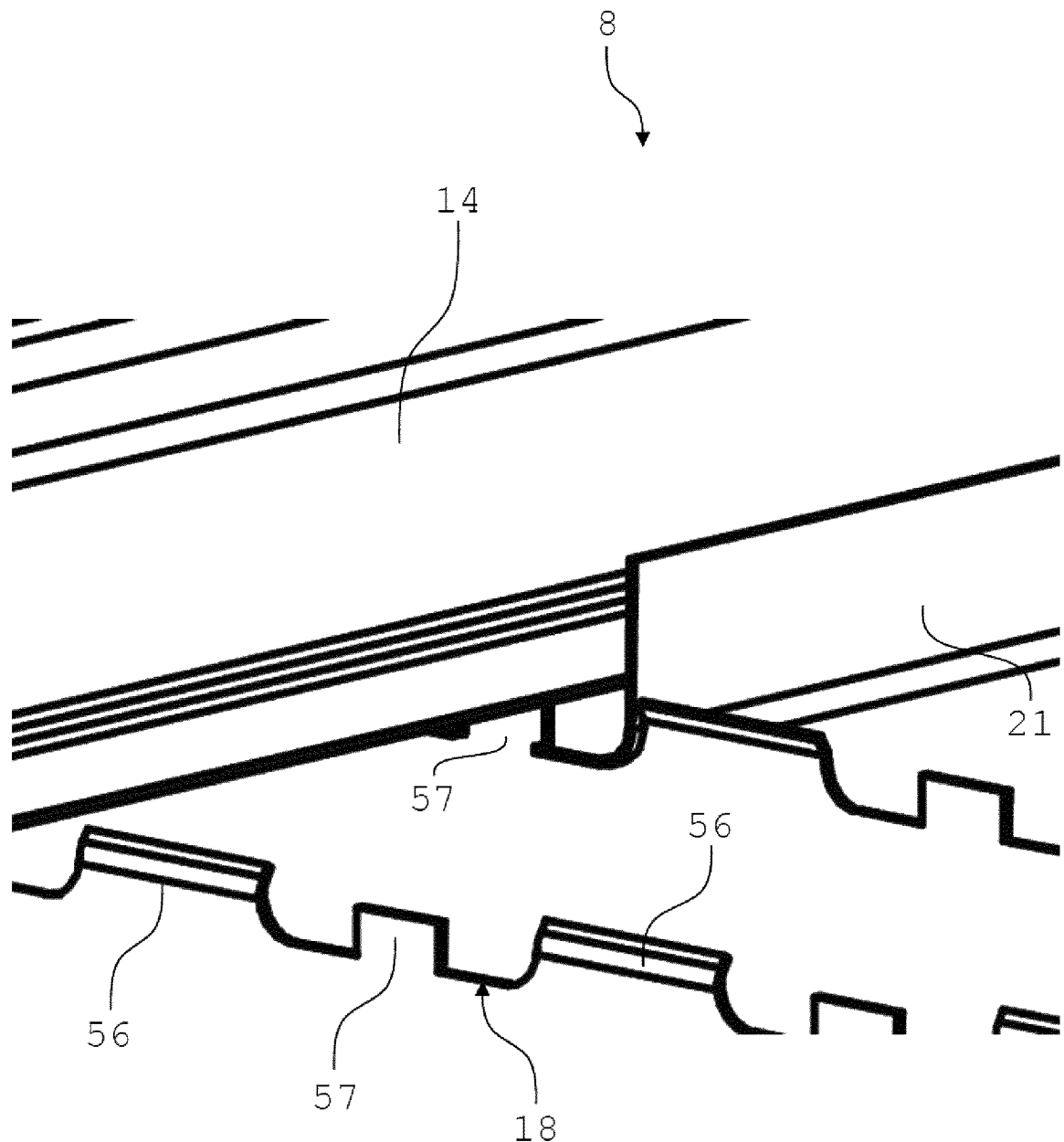
FIG. 17 shows a further schematic perspective view of the liquid collection device according to FIG. 2 during the assembly process.
Figure 18:
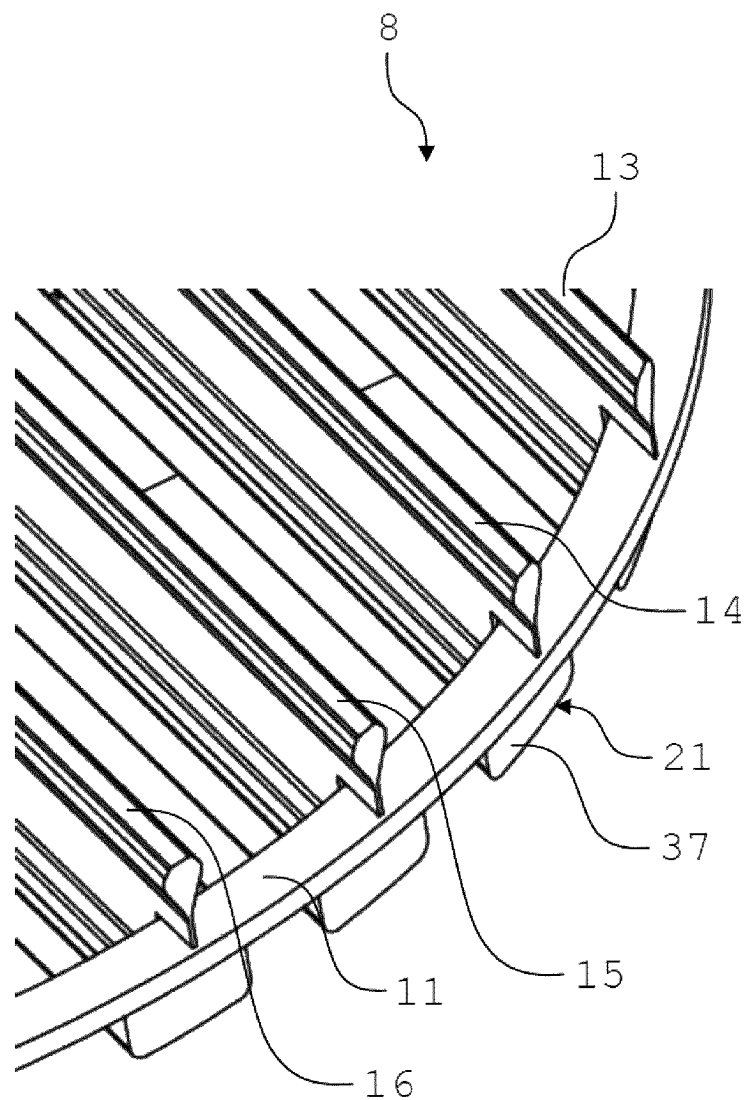
FIG. 18 shows a further schematic perspective view of the liquid collection device according to FIG. 2 during the assembly process.

In a step S5, the collection channels 19 to 21 are suspended in the collection tank 18 and are fixedly connected, in particular welded, both to the collection tank 18 and to the support ring 11, as shown in FIGS. 17 and 18. Here, on the collection channels 19 to 21, at the end sides, there is provided in each case one recess into which one of the webs 57 engages. Here, the collection channels 19 to 21 are mounted with a gradient in the direction of the collection tank 18. The collection channels 19 to 21 are open toward the collection tank 18 and, at the other side, are closed by welding to the closure sheet 37.

In the steps S3 and S5, the support profiles 12 to 16 and the collection channels 19 to 21 are fastened to the support ring 11 such that the collection channels 19 to 21 are positioned parallel to the support profiles 12 to 16 and that the support profiles 12 to 16 are arranged so as to be arranged in each case in the flow shadow 40, 41 of one of the collection channels 19 to 21. The collection channels 19 to 21 are, in the direction of the collection tank 18, welded sealingly to the latter. A tack weld may also suffice depending on requirements. In a final step S6, the cover devices 22 to 26 are inserted, and the holding elements 28, 29 are welded to the support profiles 12 to 16, as shown in FIG. 19.

Figure 19:
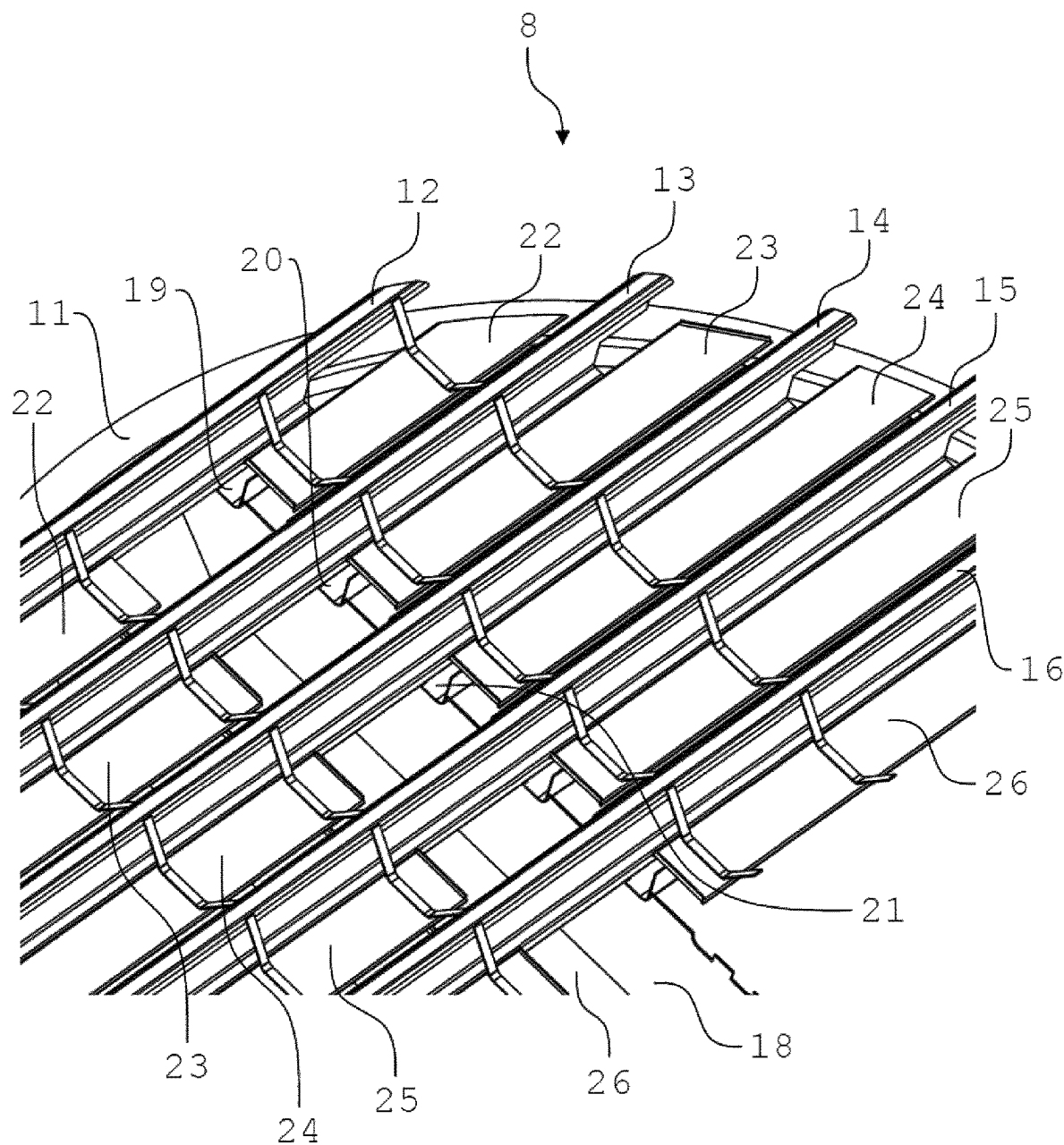
FIG. 19 shows a further schematic perspective view of the liquid collection device according to FIG. 2 during the assembly process.
Figure 20:
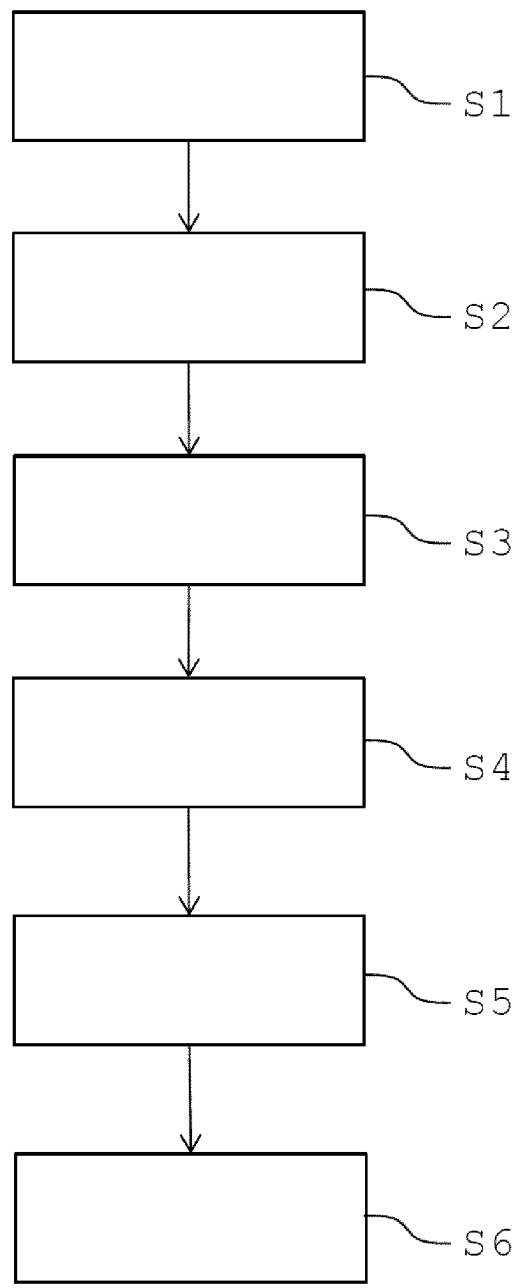
FIG. 20 shows a schematic block diagram of one embodiment of a method for producing the mass transfer column according to FIG. 1.

It can be clearly seen in FIG. 19 that the cover devices 22 to 26 are in each case arranged pairwise opposite the collection tank 18, which cover devices however do not cover the collection tank 18 in an upward direction. The collection channels 19 to 21 are also positioned pairwise at the collection tank 18. That is to say, each support profile 12 to 16 is assigned two collection channels 19 to 21 and two cover devices 22 to 26.

Figure 21:
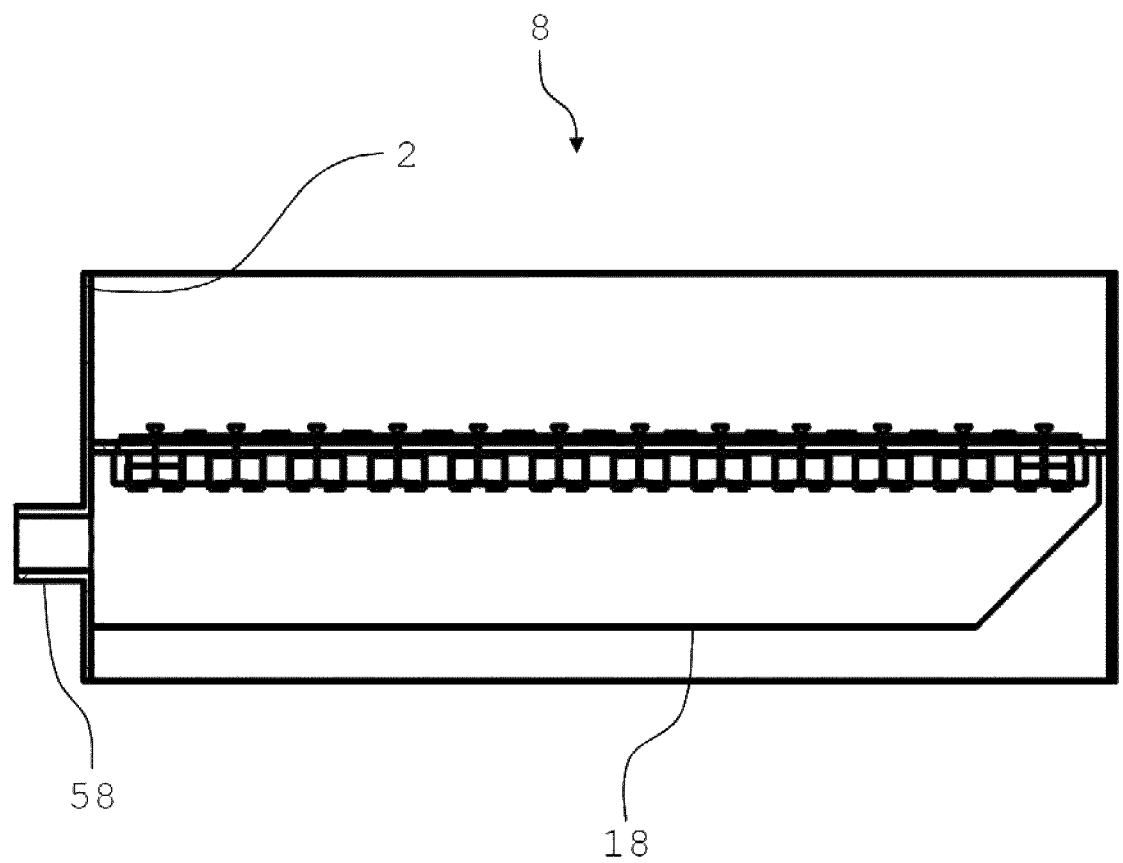
FIG. 21 shows a schematic sectional view of a further embodiment of a liquid collection device for the mass transfer column according to FIG. 1.

FIG. 21 shows, in a schematic sectional view, a further embodiment of a liquid collection device 8. In the case of this liquid collection device 8, a collection tank 18 is provided which extends at one side as far as the inner wall of the vessel 2 and is welded to the vessel 2. On the vessel 2, there is provided an infeed connector 58, in particular a gas infeed connector, through which gas can be supplied.

Figure 22:
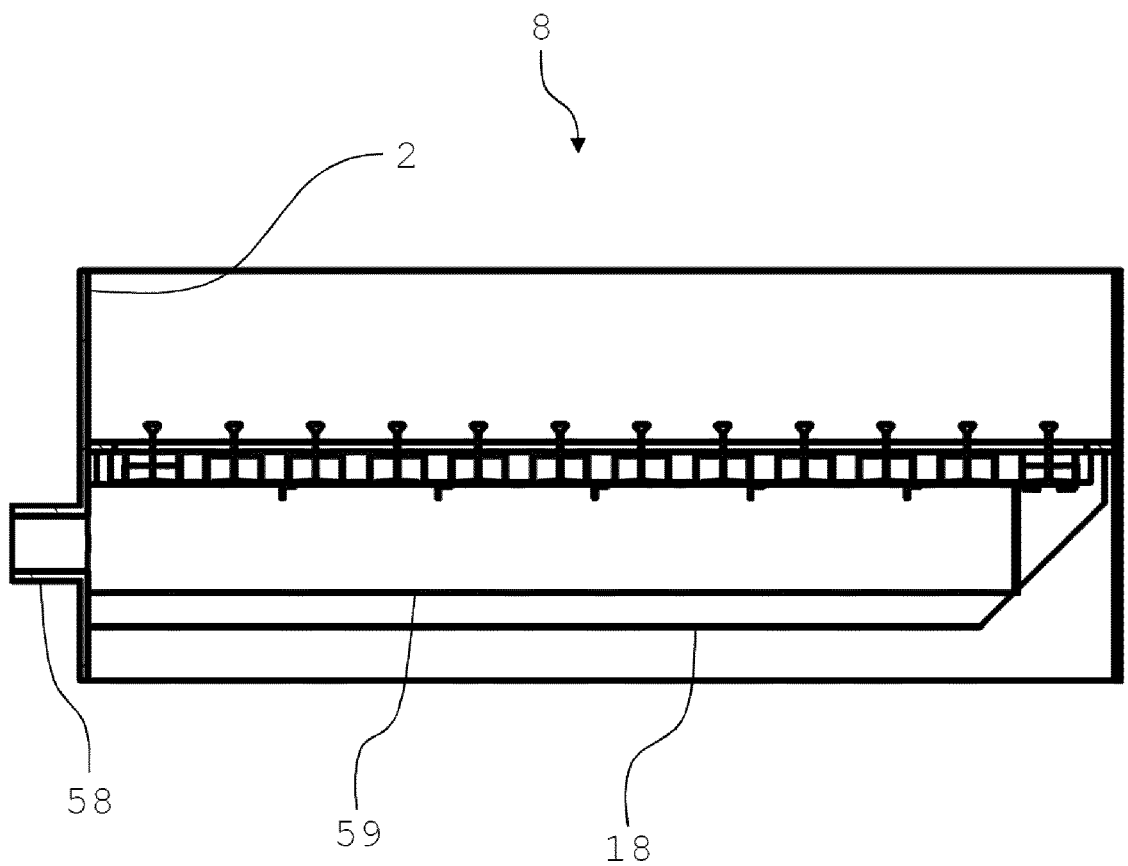
FIG. 22 shows a schematic sectional view of a further embodiment of a liquid collection device for the mass transfer column according to FIG. 1.
Figure 23:
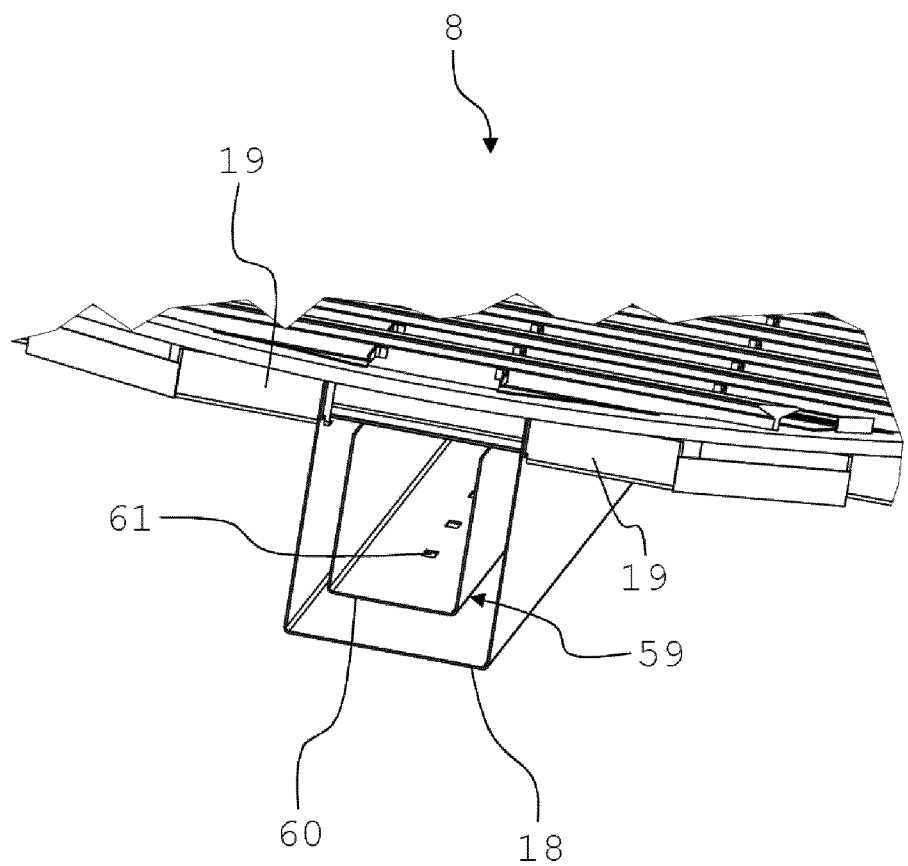
FIG. 23 shows a schematic perspective view of the liquid collection device according to FIG. 22.
Figure 24:
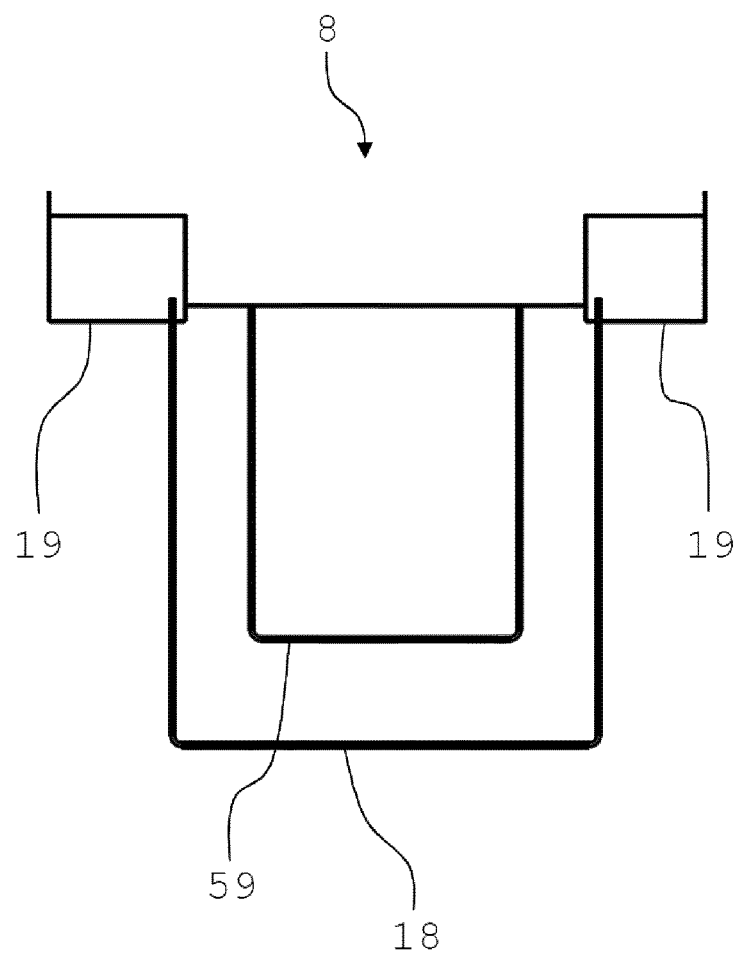
FIG. 24 shows a further schematic sectional view of the liquid collection device according to FIG. 22.

FIG. 22 shows, in a schematic sectional view, a further embodiment of a liquid collection device 8. FIG. 23 shows a schematic perspective view of the liquid collection device 8, and FIG. 24 shows a further schematic sectional view of the liquid collection device 8. By contrast to the liquid collection device 8 according to FIG. 21, said liquid collection device 8 has a gas infeed tank 59 which is fixedly connected to the support profiles 12 to 16 and which is positioned within the collection tank 18. The infeed connector 58 opens into the gas infeed tank 59. The gas infeed tank 59 comprises a base 60 with outflow openings 61. The collection channels 19 to 21 open into the collection tank 18 and not into the gas infeed tank 59. Liquid drips directly into the gas infeed tank 59 from the packing 4, which liquid flows out through the outflow openings 61.

Figure 25:
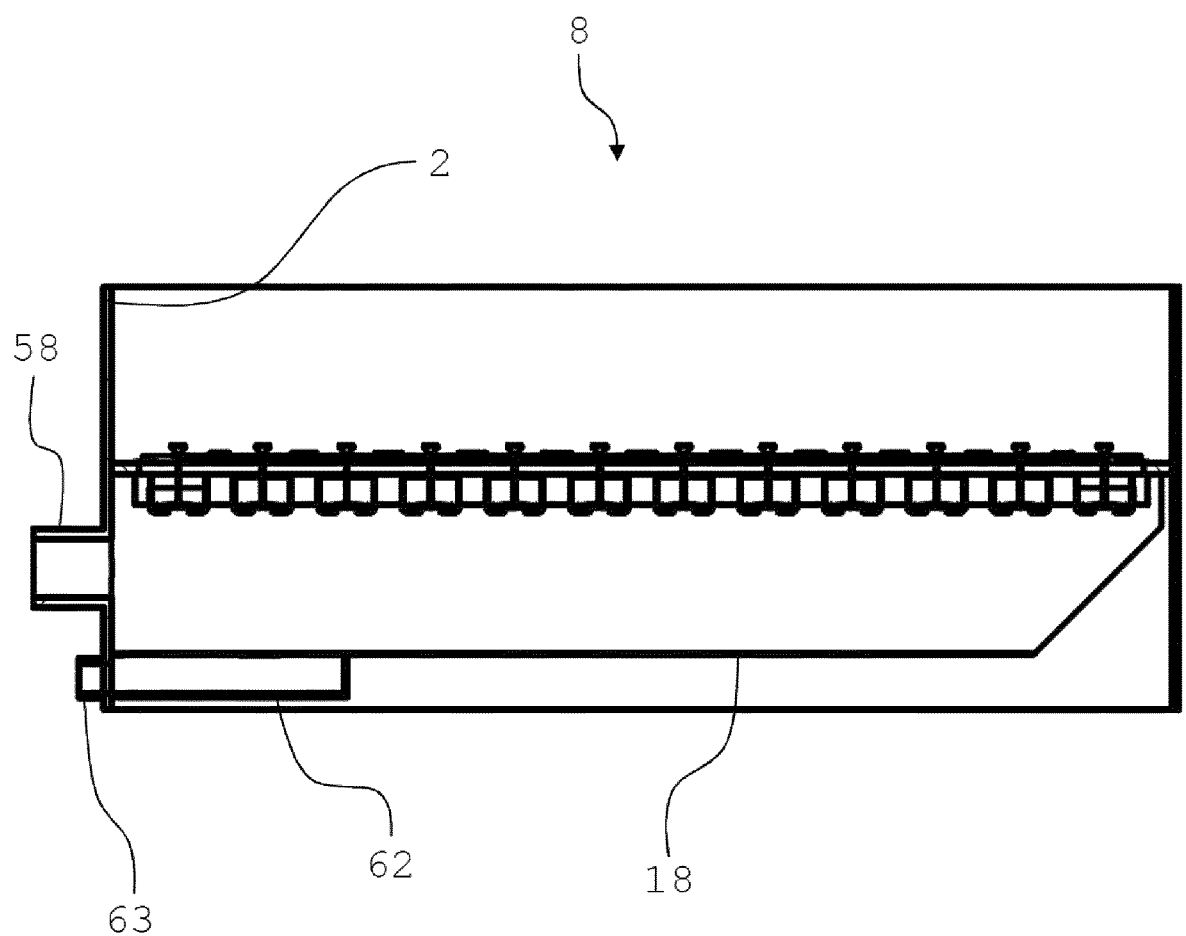
FIG. 25 shows a schematic sectional view of a further embodiment of a liquid collection device for the mass transfer column according to FIG. 1.
Figure 26:
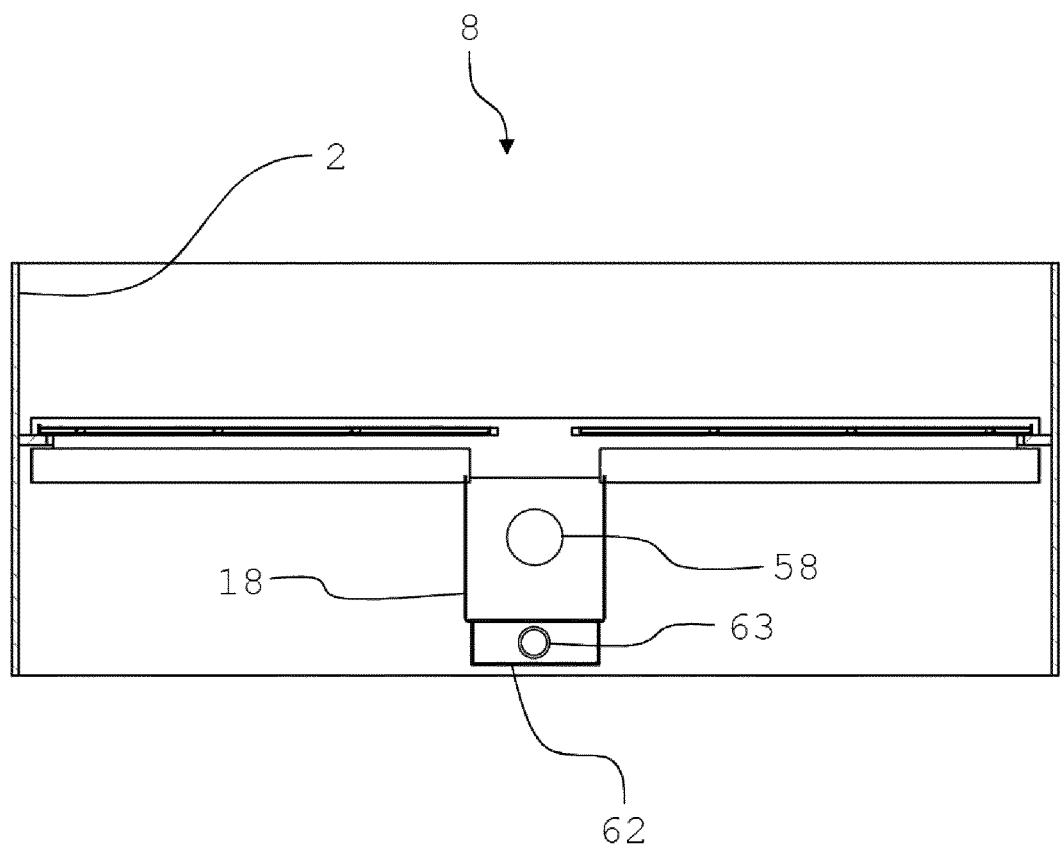
FIG. 26 shows a further schematic sectional view of the liquid collection device according to FIG. 25.

FIGS. 25 and 26 show, in each case in schematic sectional views, a further embodiment of a liquid collection device 8. This liquid collection device 8, by contrast to the liquid collection device 8 according to FIG. 21, additionally also has an extraction tank 62 with an extraction connector 63 which is provided on the vessel 2 and which serves for the extraction of liquid. The extraction tank 62 is fluidically connected to the collection tank 18 via an opening.

Figure 27:
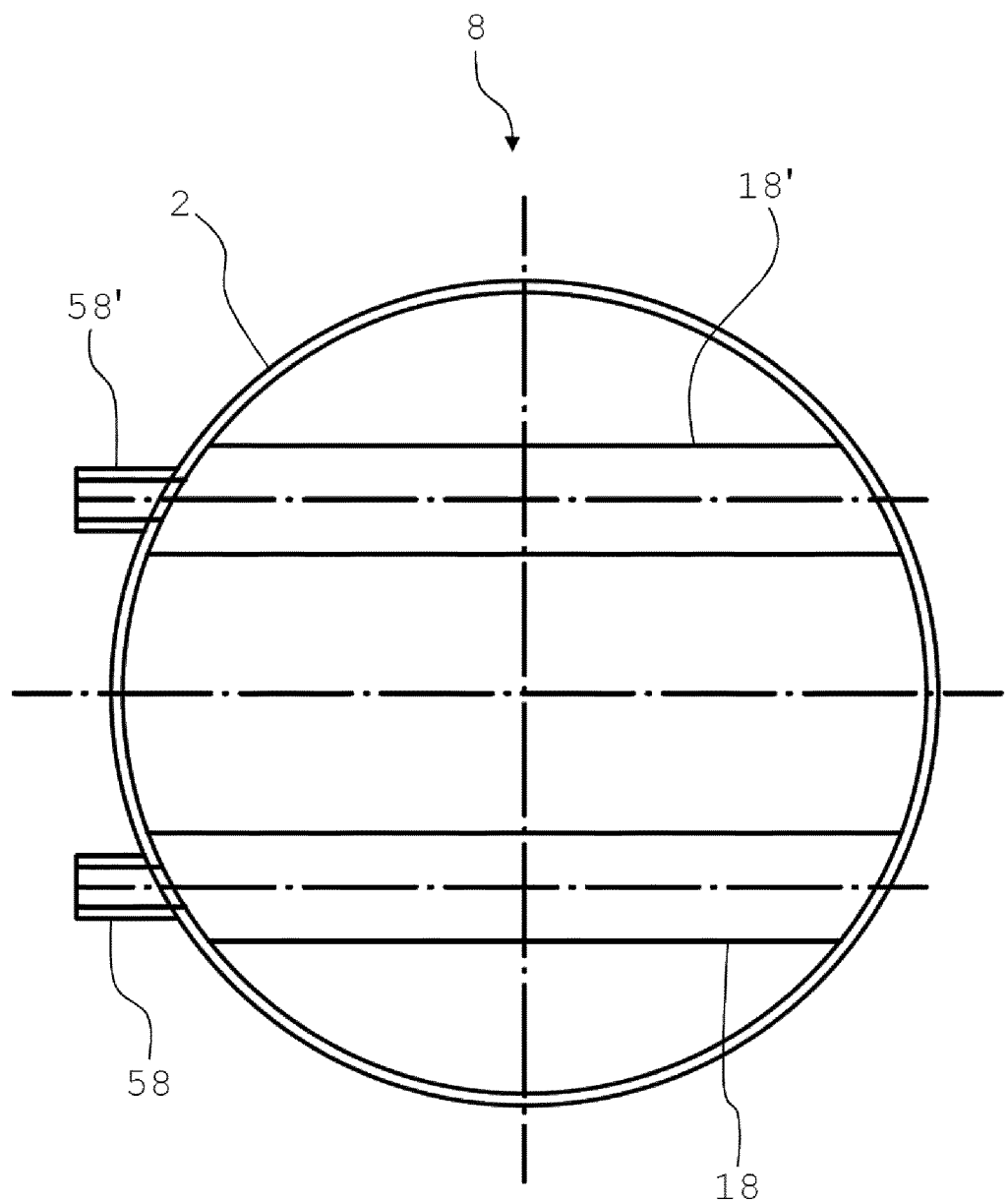
FIG. 27 shows a schematic plan view of a further embodiment of a liquid collection device for the mass transfer column according to FIG. 1.

FIG. 27 shows, in a schematic plan view, a further embodiment of a liquid collection device 8. This liquid collection device 8, by contrast to the liquid collection device 8 according to FIG. 21, has two collection tanks 18, 18' which are arranged in parallel and which have two infeed connectors 58, 58'. The collection channels 19 to 21 open into the collection tanks 18, 18'. This liquid collection device 8 is preferably used in the case of large vessel diameters.

Although the present invention has been described using exemplary embodiments, it is modifiable in various ways.

The invention claimed is:

1. A liquid collection device for collecting liquid flowing through a packing of a mass transfer column, the liquid collection device comprising:
   a support ring,
   a multiplicity of support profiles which are fastened to the support ring and which serve for supporting the packing, and
   a multiplicity of collection channels which are fastened to the support ring and which serve for collecting the liquid,
   wherein the collection channels are positioned parallel to the support profiles, and the support profiles are arranged so as to be arranged in each case in a flow shadow, with respect to a gas flow flowing through the liquid collection device counter to a direction of gravitational force, of one of the collection channels, and
   wherein each of the support profiles have in each case two flanges and a web connecting the flanges to one another, and wherein a first flange, averted from the respective collection channel, narrows in a direction of gravitational force.

2. The liquid collection device as claimed in claim 1, wherein each collection channel is assigned exactly one support profile.

3. The liquid collection device as claimed in claim 1, wherein each collection channel has two side walls and each support profile is arranged between the two side walls of a collection channel assigned to the respective support profile.

4. The liquid collection device as claimed in claim 1, wherein at least a section of each support profile is arranged within a collection channel assigned to the respective support profile.

5. The liquid collection device as claimed in claim 1, wherein the first flange is droplet-shaped.

6. The liquid collection device as claimed in claim 1, wherein each collection channel has two side walls, and, between two adjacent collection channels, there is provided in each case at least one cover device which projects at least partially beyond the side walls, facing toward one another, of the adjacent collection channels.

7. The liquid collection device as claimed in claim 6, wherein the at least one cover device has lower cover sheets, between which there is provided a gas passage which is covered by an upper cover sheet which projects laterally beyond the two lower cover sheets.

8. The liquid collection device as claimed in claim 6, wherein the at least one cover device is suspended on two adjacent support profiles.

9. The liquid collection device as claimed in claim 1, further comprising a collection tank, which is fastened to the support profiles, and into which the collection channels (19-21) open.

10. The liquid collection device as claimed in claim 9, wherein the collection tank is arranged perpendicular to the support profiles.

11. A mass transfer column comprising:
    a vessel,
    at least one packing arranged within the vessel, and
    a liquid collection device as claimed in claim 1 arranged within the vessel.

12. The mass transfer column as claimed in claim 11, further comprising a packing arrangement which has the liquid collection device a liquid distribution device, and the at least one packing, which is arranged between the liquid collection device and the liquid distribution device.

13. A method for producing a liquid collection device (1) as claimed in claim 1, the method comprising:
    providing a support ring, a multiplicity of support profiles and a multiplicity of collection channels; and
    fastening the support profiles and the collection channels to the support ring such that the collection channels are positioned parallel to the support profiles and that the support profiles are arranged so as to be arranged in each case in a flow shadow, with respect to a gas flow flowing through the liquid collection device counter to a direction of gravitational force, of one of the collection channels.

14. The liquid collection device as claimed in claim 1, wherein the first flange has a triangular cross section.

15. The liquid collection device as claimed in claim 1, wherein the first flange is diamond-shaped.

16. The liquid collection device as claimed in claim 6, wherein the at least one cover device has lower cover sheets between which there is provided a gas passage which is covered by an upper cover sheet.

17. A liquid collection device for collecting liquid flowing through a packing of a mass transfer column, the liquid collection device comprising:
    a support ring,
    a multiplicity of support profiles which are fastened to the support ring and which serve for supporting the packing, and
    a multiplicity of collection channels which are fastened to the support ring and which serve for collecting the liquid,
    wherein the collection channels are positioned parallel to the support profiles, and the support profiles are arranged so as to be arranged in each case in a flow shadow, with respect to a gas flow flowing through the liquid collection device counter to a direction of gravitational force, of one of the collection channels, and wherein each collection channel has two side walls, and, between two adjacent collection channels, there is provided in each case at least one cover device which projects at least partially beyond the side walls, facing toward one another, of the adjacent collection channels, and wherein the at least one cover device is suspended on two adjacent support profiles.

* * * * *